(12) United States Patent
    Ono

(10) Patent No.: US 11,101,998 B2
(45) Date of Patent: Aug. 24, 2021

(54) COMMUNICATION DEVICE, COMMUNICATION METHOD, AND RECORDING MEDIUM

(71) Applicant: NEC Corporation, Tokyo (JP)

(72) Inventor: Masakazu Ono, Tokyo (JP)

(73) Assignee: NEC CORPORATION, Tokyo (JP)

( * ) Notice: Subject to any disclaimer, the term of this patent is extended or adjusted under 35 U.S.C. 154(b) by 185 days.

(21) Appl. No.: 16/336,561

(22) PCT Filed: Oct. 2, 2017

(86) PCT No.: PCT/JP2017/035812
§ 371 (c)(1),
(2) Date: Mar. 26, 2019

(87) PCT Pub. No.: WO2018/066506
PCT Pub. Date: Apr. 12, 2018

(65) Prior Publication Data
US 2019/0229910 A1    Jul. 25, 2019

(30) Foreign Application Priority Data
Oct. 3, 2016   (JP) .............................. JP2016-195774

(51) Int. Cl.
*H04L 9/12* (2006.01)
*H04L 29/06* (2006.01)
(Continued)

(52) U.S. Cl.
CPC .............. *H04L 9/12* (2013.01); *H04L 9/0819* (2013.01); *H04L 9/14* (2013.01); *H04L 9/16* (2013.01); *H04L 63/045* (2013.01)

(58) Field of Classification Search
None
See application file for complete search history.

(56) References Cited

U.S. PATENT DOCUMENTS 6,590,981 B2 *   7/2003   Fruehauf ................... H04L 9/12
                                                    380/260
6,898,285 B1 *   5/2005   Hutchings ............... G06F 21/62
                                                    348/E7.056
(Continued)

FOREIGN PATENT DOCUMENTS

JP        2007-081521 A      3/2007
WO         01/63832 A1       8/2001
(Continued)

OTHER PUBLICATIONS

Communication dated Oct. 29, 2019, from the Intellectual Property Office of Taiwan in counterpart application No. 106133524.
(Continued)

*Primary Examiner* — Simon P Kanaan
(74) *Attorney, Agent, or Firm* — Sughrue Mion, PLLC

(57) ABSTRACT

A communication device according to the present invention includes: a memory; and at least one processor coupled to the memory. The processor performs operations. The operations includes: according to synchronization accuracy representing a frequency of timings at which a cryptosystem used for encryption communication between the communication device and another communication device can be changed, selecting the cryptosystem with different processing load on cryptographic processing in the encryption communication; and executing at least one of encryption processing and decryption processing on communication data with the another communication device by using the cryptosystem selected.

12 Claims, 14 Drawing Sheets

(51) Int. Cl.
*H04L 9/08* (2006.01)
*H04L 9/16* (2006.01)
*H04L 9/14* (2006.01)

(56) References Cited

U.S. PATENT DOCUMENTS

2011/0145597 A1  6/2011  Yamaguchi et al.
2016/0057114 A1  2/2016  Unagami et al.

FOREIGN PATENT DOCUMENTS

| WO | 01/95613 A1 | 12/2001 |
| WO | 2011/114373 A1 | 9/2011 |
| WO | 2013/076848 A1 | 5/2013 |
| WO | 2015/170452 A1 | 11/2015 |

OTHER PUBLICATIONS

Communication dated Aug. 6, 2019 from European Patent Office in counterpart EP Application No. 17858344.9.
International Search Report of PCT/JP2017/035812 dated Oct. 31, 2017 [PCT/ISA/210].
Written Opinion of PCT/JP2017/035812 dated Oct. 31, 2017 [PCT/ISA/237].
Communication dated Oct. 14, 2020 by the Indian Patent Office in application No. 201917009624.

* cited by examiner

Fig. 10

| DETERMINATION RESULT | DIFFERENCE IN CLOCK INFORMATION | RESPONSE TIME OF SYNCHRONIZATION PROCESSING | ACCURACY OF CLOCK INFORMATION |
|---|---|---|---|
| HIGH SYNCHRONIZATION | SMALLER THAN REFERENCE DIFFERENCE VALUE | SHORTER THAN REFERENCE RESPONSE TIME | – |
| | SMALLER THAN REFERENCE DIFFERENCE VALUE | – | GENERATE HIGH ACCURATE CLOCK INFORMATION |
| LOW SYNCHRONIZATION | – | LONGER THAN REFERENCE RESPONSE TIME | GENERATE LOW ACCURACY CLOCK INFORMATION |
| | LARGER THAN REFERENCE DIFFERENCE VALUE | LONGER THAN REFERENCE RESPONSE TIME | – |
| | LARGER THAN REFERENCE DIFFERENCE VALUE | – | GENERATE LOW ACCURACY CLOCK INFORMATION |
| ASYNCHRONOUS | – | SYNCHRONIZATION PROCESSING EXECUTION IMPOSSIBLE (IMPOSSIBLE TO TRANSMIT CLOCK ADJUSTMENT DATA AND THE LIKE) | – |
| | – | NO RESPONSE | – |

COMMUNICATION DEVICE, COMMUNICATION METHOD, AND RECORDING MEDIUM

CROSS REFERENCE TO RELATED APPLICATIONS

This application is a National Stage of International Application No. PCT/JP2017/035812, filed Oct. 2, 2017, claiming priority to Japanese Patent Application No. 2016-195774, filed Oct. 3, 2016, the contents of all of which are incorporated herein by reference in their entirety.

TECHNICAL FIELD

The present disclosure relates to a technique for performing communication using encrypted communication data.

BACKGROUND ART

In recent years, a communication method for transmitting and receiving encrypted data (encryption communication) is widely used. In encryption communication, each communication device performs encryption processing and decryption processing of communication data by using secret information (for example, key). Hereinafter, encryption processing and decryption processing for data are collectively referred to as "cryptographic processing". Non-encrypted data is referred to as "plain-text data", and data acquired by encrypting plain-text data is referred to as "cipher-text data". The key used for encryption and the key used for decryption are collectively referred to as "encryption key". The key used for encryption and the key used for decryption may be the same key data (for example, a common key cryptosystem), or a pair of different key data (for example, a public key cryptosystem).

When the encryption key is leaked, cipher-text encrypted using the encryption key is compromised. When the number of encrypted cipher-texts encrypted using the same encryption key increases, there is the possibility of giving attackers clues to attack against cryptographic processing. Therefore, in encryption communication, encryption key and encryption algorithm may be changed as appropriate. In order to maintain encryption communication, each communication device changes the encryption key, for example, synchronously.

Techniques related to such change of encryption key and the like are described in a patent literature (PTL) below. That is, PTL 1 describes a technique for executing encryption communication using a temporary key between a first encryption communication device acquiring the temporary key from a management device and a second encryption communication device having the same or corresponding master key in the management device. The management device periodically updates data for generating the temporary key, and therefore the temporary key used for encryption communication is changed.

CITATION LIST

Patent Literature

[PTL 1] International Publication No. 2013/076848

SUMMARY OF INVENTION

Technical Problem

Hereinafter, elements used for encryption communication, such as encryption algorithm, encryption key, cryptographic usage mode, and the like, may be collectively described as cryptosystem. In general, the processing load of cryptosystems with high encryption strength tends to be high, and there is a possibility that throughput of communication may be lowered by cryptographic processing. Moreover, when the load of cryptographic processing is high, power consumption generally increases. On the other hand, encryption strength of cryptosystem with relatively little influence on communication throughput (relatively low processing load) can be relatively low. That is, there is an issue of maintaining the security of encryption communication while reducing the influence on the processing load regarding cryptographic processing.

Meanwhile, above-PTL 1 discloses a technique for periodically changing the encryption key used for encryption communication and verifying the validity of the encryption key. That is, the technique disclosed in PTL 1 is a technique focusing on changing the encryption key, and does not take into consideration the processing load related to cryptographic processing.

The present disclosure has been made in view of the above circumstances. That is, it is one of main objects of the present disclosure to provide a communication device and the like capable of reducing the influence of the load of cryptographic processing while maintaining the security of encryption communication.

Solution to Problem

In order to achieve the above objects, a communication device according one aspect of the present disclosure includes:

a memory; and at least one processor coupled to the memory.

The processor performs operations. The operations includes:

according to synchronization accuracy representing a frequency of timings at which a cryptosystem used for encryption communication between the communication device and another communication device can be changed, selecting the cryptosystem with different processing load on cryptographic processing in the encryption communication; and executing at least one of encryption processing and decryption processing on communication data with the another communication device by using the crypto system selected.

Further, a communication method according one aspect of the present disclosure includes:

according to synchronization accuracy representing a frequency of timings at which a cryptosystem used for encryption communication between the communication device and another communication device can be changed, selecting the cryptosystem with different processing load on cryptographic processing in the encryption communication; and executing at least one of encryption processing and decryption processing on communication data with the another communication device by using the cryptosystem selected.

Further, the similar objects can be achieve by a computer program (communication program) which realizes the above the communication device and the communication method by a computer, a recording medium computer-readably storing the compute program, and the like.

That is, the computer program according one aspect of the present disclosure causes a computer to perform a method. The method includes:

according to synchronization accuracy representing a frequency of timings at which a crypto system used for encryption communication between the communication device and another communication device can be changed, selecting the cryptosystem with different processing load on cryptographic processing in the encryption communication; and executing at least one of encryption processing and decryption processing on communication data with the another communication device by using the cryptosystem selected.

Advantageous Effects of Invention

According to the present disclosure, a communication device is capable of reducing the influence of the load of cryptographic processing while maintaining the security of encryption communication.

BRIEF DESCRIPTION OF DRAWINGS

FIG. 10 is an explanatory diagram illustrating an example of information used in determining synchronization accuracy according to the second example embodiment of the present disclosure.

EXAMPLE EMBODIMENT

Figure 1:
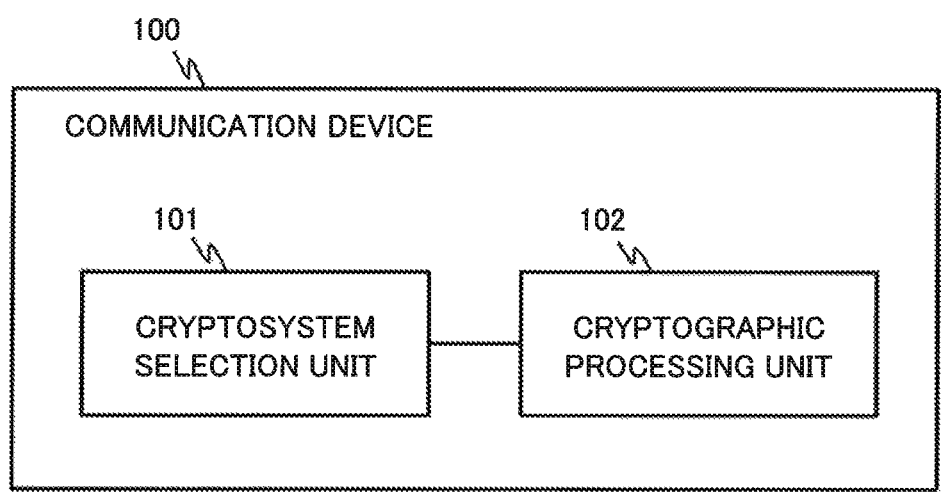
FIG. 1 is a block diagram illustrating an example of a functional configuration of a communication device according to a first example embodiment of the present disclosure.

Before describing the example embodiment of the present disclosure, technical considerations and the like on the present disclosure made by the present disclosure inventor will be described in more detail.

As described above, each communication device capable of executing encryption communication executes cryptographic processing on communication data by using a certain cryptosystem. For example, when a common key cryptosystem is used, each communication device performs cryptographic processing on communication data by using a common encryption key. For example, when a public key cryptosystem is used, each communication device performs encryption processing and decryption processing of communication data by using a public key and a secret key. In either case, each communication device performs cryptographic processing by using the same cryptosystem.

For example, in encryption communication, increasing encrypted data with the same cryptosystem can increase cryptanalysis clues available to attackers. From the viewpoint of reducing such risks, in encryption communication, processing for appropriately changing the cryptosystem is executed. In this case, from the viewpoint of maintaining encryption communication, each communication device changes (updates) the cryptosystem in synchronization, for example, so as to be able to use the same cryptosystem with another communication device.

However, depending on the environment in which the communication device is deployed, there may be situations where it is difficult for each communication device to change the cryptosystem along with another communication device. When it is difficult to change the cryptosystem, each communication device may execute encryption communication over the relatively long period by using the same cryptosystem (for example, the same encryption key, encryption algorithm, and the like). This may increase the cipher-texts generated by one cryptosystem. In this case, from the viewpoint of maintaining the security of encryption communication, a cryptosystem that is difficult to decrypt (high encryption strength) can be adopted, but it is considered that cryptosystem which is difficult to decrypt generally has an issue in that the load required for the cryptographic processing is high (high processing load).

On the other hand, it is considered that each communication device can appropriately change the cryptosystem together with another communication device. In the situation, for example, it is possible to change the cryptosystem frequently, and it is considered that the amount (size) of the cipher-text generated by the same cryptosystem (for example, encryption key, encryption algorithm, and the like) is suppressed. In such a situation, for example, since the scope of influence can be limited when an encryption key relating to certain cryptosystem is compromised, it is considered to use a cryptosystem with a small load (low processing load) for cryptographic processing.

Therefore, the communication device according to the present disclosure, which will be described in each of the following example embodiments, is configured to appropriately select a cryptosystem used for encryption communication according to the degree to which the cryptosystem can be changed (for example, a frequency of timings at which change is allowed).

It is considered that each communication device can update the cryptosystem frequently when there are many timings in which the cryptosystem can be changed. More specifically, if each communication device can easily (frequently) execute synchronization processing synchronizing information related to cryptosystem, each communication device is considered to be able to change cryptosystem frequently. Further, it is considered that, when each communication device can maintain chronological changes of information (information to be synchronized) related to cryptosystem (differences due to chronological errors or the like) at a small level, each communication device can frequently update cryptosystem.

On the other hand, for example, when each communication device cannot execute the synchronization processing frequently, or it is difficult to maintain the chronological changes of the information stored by each communication device at a small level, it may be difficult for each communication device to update the cryptosystem.

In view of the above, the communication device according to the present disclosure is configured to adopt, for example, a cryptosystem with a low processing load as there are more timings at which the cryptosystem can be changed. Alternatively, the communication device according to the present disclosure is configured to adopt, for example, a cryptosystem (cryptosystem with a high processing load) which is difficult to decrypt as there are less timings at which the cryptosystem can be changed with other communication devices. According to the communication device according to the present disclosure configured as described above, by using an appropriate cryptosystem according to a situation where communication devices can change the cryptosystem, the influence on communication throughput can be reduced while maintaining the security of encryption communication. Hereinafter, an example embodiment capable of realizing such communication device will be described in detail.

The configuration of the communication device described in each of the following example embodiments are examples, and the technical scope of the present disclosure is not limited thereto. The division of the constituent elements constituting the communication device (for example, division by functional unit) in each of the following example embodiments is an example with which the communication device can be realized. When implementing the communication device, it is not limited to the following example, and various configurations are assumed. That is, the constituent elements constituting the communication device in each of the following example embodiments may be further divided, and one or more constituent elements may be integrated.

The communication device described below may be configured using a single device (physical or virtual device), or may be realized by using a plurality of separated devices (physical or virtual devices). A communication device described below or a hardware configuration capable of realizing the constituent elements will be described later.

First Example Embodiment

Hereinafter, a basic example embodiment of the present disclosure will be described.

FIG. 1 is a block diagram illustrating an example of a functional configuration of a communication device 100 according to a first example embodiment of the present disclosure.

The communication device 100 is a device capable of executing encryption communication. For a single communication device 100, one or more other communication devices may be connected. A communication path connecting the communication device 100 to another communication device may be realized by, for example, wireless communication, wired communication, or a combination thereof. Further, a communication protocol used for such communication is not particularly limited and may be appropriately selected. Another communication device 100 communicatively connected to the communication device 100 may be a communication device configured similarly to the communication device 100.

As illustrated in FIG. 1, the communication device 100 includes a cryptosystem selection unit 101 and a cryptographic processing unit 102. These constituent elements constituting the communication device 100 may be connected so as to be able to communicate data, command (command), and the like. Hereinafter, these constituent elements constituting the communication device 100 will be described.

The cryptosystem selection unit 101 (cryptosystem selection means) is configured to select a cryptosystem with different processing loads for cryptographic processing in encryption communication according to the synchronization accuracy (synchronization status) which represents the degree to which cryptosystem used for encryption communication between the communication device and another communication device can be updated.

For example, the cryptosystem selection unit 101 may determine that the synchronization accuracy is high as there are more timings at which the communication device and another communication device update the cryptosystem in synchronization. In this case, the cryptosystem selection unit 101 may select a cryptosystem with a lower processing load required for cryptographic processing, for example, as the synchronization accuracy is higher. For example, when the communication device 100 and another communication device can frequently update the cryptosystem (that is, when there are more timings at which the cryptosystem can be changed), the amount of cipher-text generated by a single cryptosystem can be limited. Therefore, even when a single cryptosystem is compromised, scope of the influence is limited. In this case, the cryptosystem selection unit 101 can reduce the influence on the communication by cryptographic processing while maintaining the security of the encryption communication to some extent by adopting a cryptosystem with a relatively low load of cryptographic processing.

Further, for example, the cryptosystem selection unit 101 may determine that the synchronization accuracy is low as there are less timings at which the communication device and another communication device can change the cryptosystem in synchronization. In this case, for example, the cryptosystem selection unit 101 may select a cryptosystem that is more difficult to decrypt (the processing load required for cryptographic processing is higher) as the synchronization accuracy is lower. For example, when it is difficult to synchronize the communication device with another communication device and the cryptosystem cannot be updated frequently (that is, when there are less timings at which the cryptosystem can be changed), there is a possibility that the amount of cipher-text generated by a single cryptosystem may increase. In this case, the cryptosystem selection unit 101 can maintain the security of the encryption communication by selecting a cryptosystem of which the load of cryptographic processing is relatively heavy (difficult to decrypt).

The cryptographic processing unit 102 (cryptographic processing means) is configure to execute at least one of encryption processing and decryption processing on communication data with another communication device by using the cryptosystem selected by the cryptosystem selection unit 101. In other words, the cryptographic processing unit 102 executes cryptographic processing on communication data transmitted to and received from another communication device by using the cryptosystem selected by the cryptosystem selection unit 101.

Figure 2:
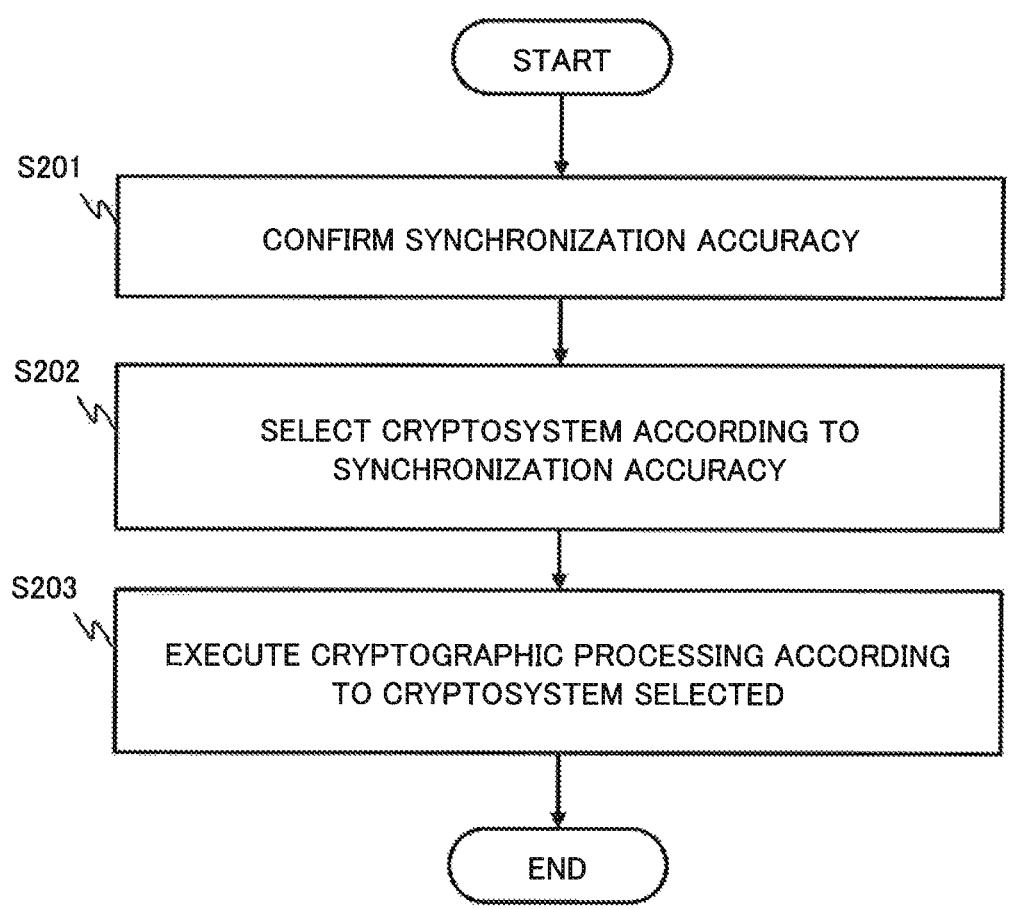
FIG. 2 is a flowchart illustrating an example of an operation of the communication device according to the first example embodiment of the present disclosure.

The operation of the communication device 100 configured as described above will be described with reference to the flowchart illustrated in FIG. 2. The flowchart illustrated in FIG. 2 may be executed, for example, when the communication device 100 starts encryption communication with another communication device, may be periodically executed, or may be executed at other appropriate timing.

The cryptosystem selection unit 101 confirms the synchronization accuracy between the communication device (communication device 100) and another communication device (step S201). Such synchronization accuracy may be derived based on, for example, the magnitude of the difference of information synchronized between the communication device and another communication device (for example, the magnitude of the difference between the clocks to be synchronized), the configuration of another communication device, or the like.

The cryptosystem selection unit 101 selects a cryptosystem according to the synchronization accuracy confirmed in step S201 (step S202). For example, the cryptosystem selection unit 101 selects a cryptosystem having a lower processing load required for cryptographic processing as the synchronization accuracy between the communication device and another communication device is higher (that is, there are more timings at which the cryptosystem can be changed). Alternatively, the cryptosystem selection unit 101 may select, for example, a cryptosystem having a higher processing load required for cryptographic processing as the accuracy of synchronization between the communication device and another communication device is lower (that is, there are less timings at which the cryptosystem can be changed). The cryptosystem selection unit 101 can select, for example, as the cryptosystem, an encryption key, an encryption algorithm, and parameters related to the encryption algorithm (key length, block length, encryption mode, and the like) which are used for cryptographic processing.

Note that the cryptosystem selection unit 101 may execute processing of agreeing the cryptosystem selected with another communication device as necessary.

The cryptographic processing unit 102 executes cryptographic processing (for example, at least one of encryption processing and decryption processing) on communication data with another communication device by using the cryptosystem selected in step S202 (step S203). As a result, the cryptographic processing unit 102 can execute cryptographic processing on communication data by using the cryptosystem being with appropriate processing load and selected according to the synchronization status between the communication device (communication device 100) and another communication device.

The communication device 100 configured as described above can reduce the influence of the load of cryptographic processing while maintaining the security of encryption communication. The reason is that the cryptosystem selection unit 101 selects the appropriate cryptosystem according to the synchronization status between the communication device 100 and another communication device.

For example, when the communication device 100 and another communication device are synchronized with high accuracy (when there are many timings at which the cryptosystem can be changed), the communication device 100 (cryptosystem selection unit 101) may select cryptosystem with a relatively low processing load. Thereby, the influence on the communication processing due to the load of the cryptographic processing is reduced. Further, since the cryptosystem is frequently changed, even when a single cryptosystem (encryption key, encryption algorithm, and the like) is compromised, it is possible to easily switch to a safe cryptosystem and the scope of influence caused by compromised cryptosystem is also limited. As a result, it is possible to maintain the security of encryption communication.

Alternatively, for example, when it is difficult to synchronize the communication device 100 with another communication device with high accuracy, there is a possibility that the same cryptosystem is used for a relatively long time. Therefore, in this case, the communication device 100 may select a cryptosystem that is difficult to decrypt (relatively high processing load). As a result, the communication device 100 can maintain the security of the encryption communication.

Second Example Embodiment

Hereinafter, a second example embodiment of the present disclosure based on the first example embodiment will be described.

Figure 3:
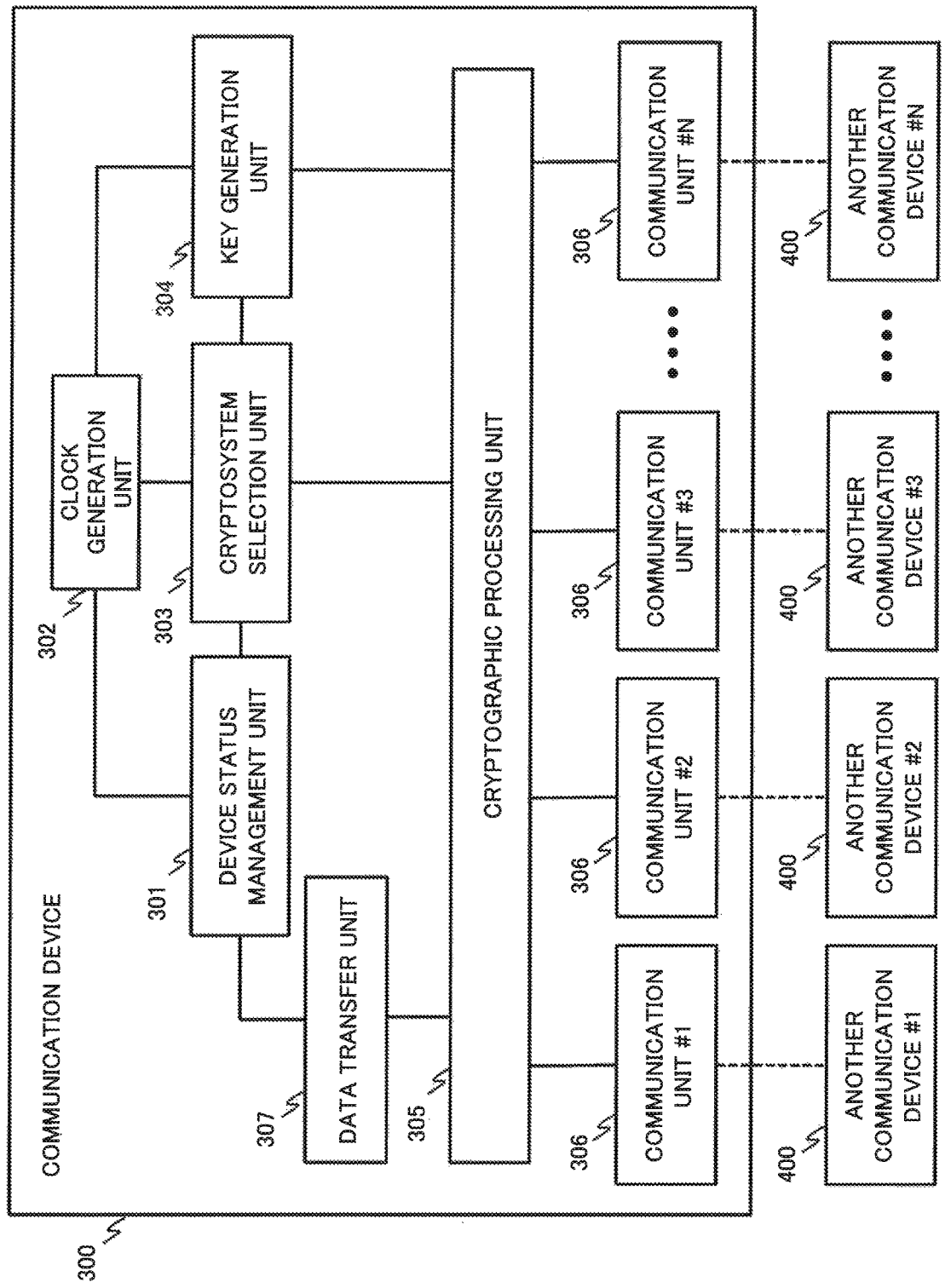
FIG. 3 is a block diagram illustrating an example of a functional configuration of a communication device according to a second example embodiment of the present disclosure.

FIG. 3 is a block diagram illustrating an example of a functional configuration of a communication device 300 according to the present example embodiment. The communication device 300 is a device capable of executing encryption communication. For a single communication device 300, one or more other communication devices 400 may be communicatively connected. The other communication device 400 may be, for example, a communication device having a configuration similar to the communication device 300.

A communication path connecting the communication device 300 and the communication device 400 may be realized by, for example, wireless communication, wired communication, or a combination thereof. Further, a communication protocol used for such communication is not particularly limited and may be appropriately selected.

In the present example embodiment, for the sake of convenience of explanation, an aspect in which the communication device 300 changes the encryption key constituting the cryptosystem is illustrated as an example, but the present example embodiment is not limited thereto. For each communication device may appropriately change, for example, the encryption algorithm constituting the cryptosystem, the cryptographic usage mode, and other various parameters related to cryptographic processing.

As illustrated in FIG. 3, the communication device 300 includes a device-status management unit 301, a clock generation unit 302, a cryptosystem selection unit 303, a key generation unit 304, and a cryptographic processing unit 305. The communication device 300 may include a communication unit 306 and a data transfer unit 307. These constituent elements constituting the communication device 300 may be connected so as to be capable of transmitting data and commands (commands). Hereinafter, these constituent elements constituting the communication device 300 will be described.

The device-status management unit 301 (device-status management means) manages the synchronization status between the communication device (communication device 300) and another communication device 400. In the present example embodiment, the device-status management unit 301 manages the synchronization status of clock information (described later) in the communication device and another communication device 400.

Figure 5:
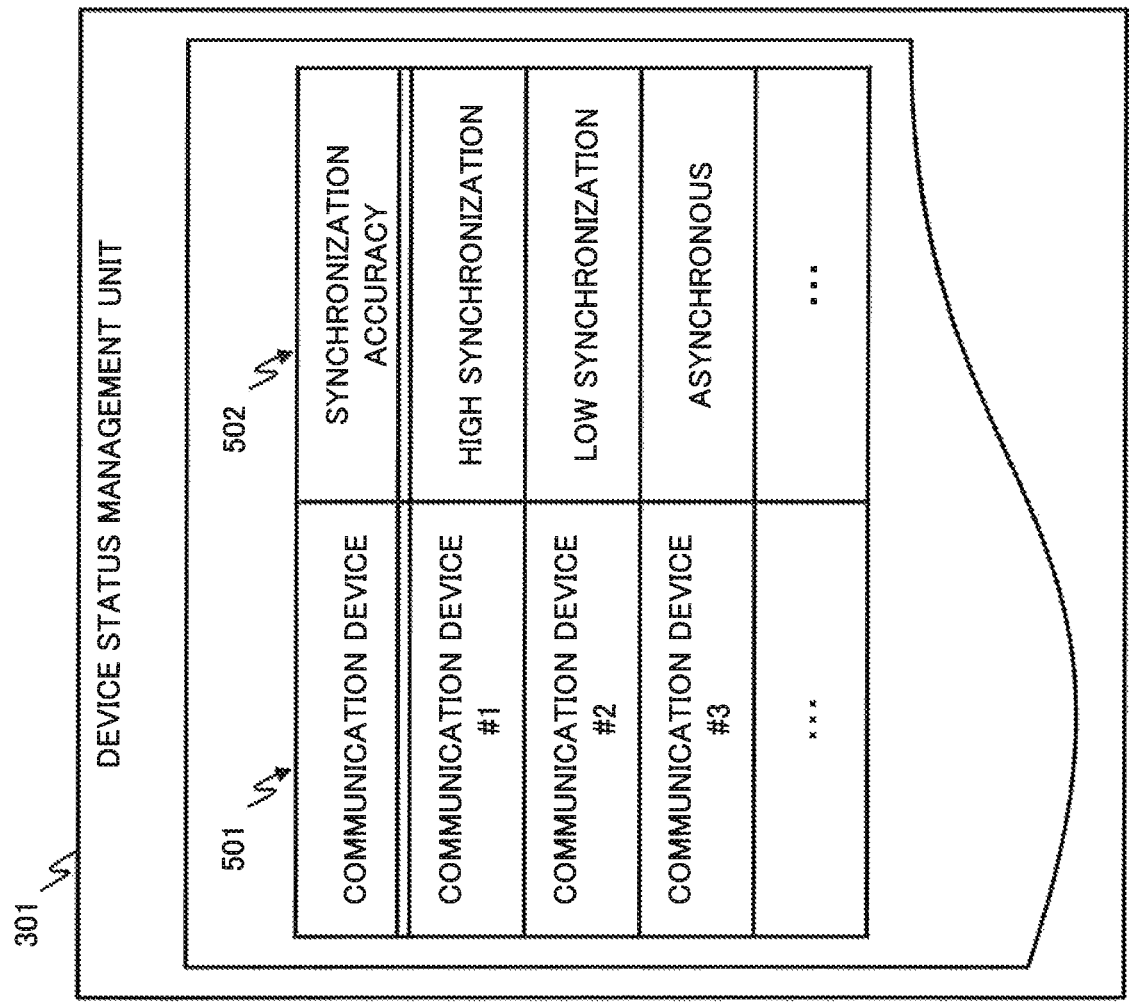
FIG. 5 is an explanatory diagram illustrating an example of information that maintains synchronization accuracy between the communication device and another communication device according to the second example embodiment of the present disclosure.

The device-status management unit 301 may hold (store) the information representing the accuracy of the synchronization in association with another communication device 400 by using a table as exemplified in FIG. 5, for example. In the table illustrated in FIG. 5, the communication device (501 in FIG. 5) indicates identification information (ID: Identifier) capable of specifying another communication device 400. Such identification information may be, for example, an address in a communication network of another communication device 400 or may be a host name or the like. Such identification information is not limited to the above, and can be selected appropriately. The synchronization accuracy (502 in FIG. 5) represents the accuracy of synchronization between the communication device 300 and another communication device 400. In the case of the specific example illustrated in FIG. 5, a label representing the accuracy of synchronization, such as "high synchronization", "low synchronization", or "asynchronous", is set as the synchronization accuracy 502. In this case, the synchronization accuracy is lower in the order of "high synchronization", "low synchronization", and "asynchronous". Note that the synchronization accuracy 502 is not limited to the above, and data (for example, a numerical value or the like) that can represent synchronization accuracy in multiple stages may be set.

The device-status management unit 301 is configured to execute processing of synchronizing clock information generated by the clock generation unit 302 (described later) as information on the cryptosystem between the communication device 300 and another communication device 400.

Note that the device-status management unit 301 may store (hold) data used for generating an encryption key in encryption communication (hereinafter referred to as "device information"). The device-status management unit 301 may store a pre-shared key or the like common to all the communication devices as a variation of the above device information.

The clock generating unit 302 (clock generation means) is configured to generate clock information, which is information representing timing, by using a periodic clock signal. The clock generation unit 302 can provide the generated clock information to other constituent elements of the communication device 300.

The generation unit 302 generates a clock signal by using, for example, an appropriate device (oscillation device or the like) capable of generating a clock signal satisfying a predetermined frequency accuracy. More specifically, the clock generation unit 302 may generate a clock signal by using, for example, an atomic clock including a rubidium atom oscillator, a cesium atom oscillator, or the like. In this case, the clock generation unit 302 can generate a clock signal with extremely high accuracy (for example, a frequency accuracy of about "±5×10E−11"). For example, when the clock generation unit 302 uses an atomic clock device, it is possible to adjust the clock signal by using the synchronization signal input prepared in the atomic clock device. The specific timing for adjusting the clock signal may be, for example, periodic timing or timing representing a specific time.

Instead of using an extremely high-accuracy device such as atomic clock, the clock generation unit 302 may generate a clock signal by using, for example, a generally-available crystal oscillator. For example, the clock generation unit 302 may maintain the accuracy of the clock signal by adjusting the clock signal so as to match particular timing.

Note that the timing of adjusting the clock signal may be given from the device-status management unit 301, for example. As a result, the device-status management unit 301 can, for example, synchronize the clock generated by the clock generation unit 302 with another communication device 400.

The clock information generated by the clock generation unit 302 may be, for example, information representing a periodic clock signal itself. Alternatively, the clock information may be information representing a counter value acquired by counting clock signals from a certain timing. Alternatively, the clock generation unit 302 may generate clock information including information representing time. Further, the clock generation unit 302 may generate clock information including information representing elapsed time from a certain timing.

The cryptosystem selection unit 303 (cryptosystem selection means) selects a cryptosystem according to the synchronization accuracy with another communication device 400. For example, the cryptosystem selection unit 303 may select a cryptosystem with a lower processing load for cryptographic processing as the accuracy of synchronization between the communication device (communication device 300) and another communication device 400 is higher. Further, for example, the cryptosystem selection unit 303 may select a cryptosystem with a higher processing load for cryptographic processing as the accuracy of synchronization between the communication device (communication device 300) and another communication device 400 is lower.

As an example, in the case of the specific example illustrated in FIG. 5, the cryptosystem selection unit 303 may select, as a cryptosystem used for encryption communication with the "communication device #1", a cryptosystem with a lower processing load than the cryptosystem used for encryption communication with the "communication device #2". The cryptosystem selection unit 303 may select, as a cryptosystem used for encryption communication with the "communication device #2", a cryptosystem with a lower processing load than cryptosystem used for encryption communication with the "communication device #3". For example, the cryptosystem selection unit 303 may select a cryptosystem with different key length using the same algorithm as cryptosystem with different processing load. As a specific example, for example, the cryptosystem selection unit 303 may respectively select cryptosystems of which safety indexes of encryption strengths are 128 bits, 192 bits, and 256 bits, as the cryptosystems for the "communication device #1", the "communication device 42", and the "communication device #3", respectively. More specifically, for example, the cryptosystem selection unit 303 may respectively select Advanced Encryption Standard (AES)-128 with a key length of 128 bits, AES-192 with a key length of 192 bits, and AES-256 with a key length of 256 bits. For example, the cryptosystem selection unit 303 may select RSA public key ciphers with key lengths of 3072 bits, 7680 bits, and 15360 bits. The cryptosystem selection unit is not limited thereto, and may select, as cryptosystems with different processing loads, cryptosystems with different encryption algorithms, or cryptosystems with different encryption algorithms and different key lengths. An encryption algorithm constituting the cryptosystem selected by the cryptosystem selection unit 303 is not particularly limited, and, for example, an appropriate encryption algorithm confirmed to be safe can be adopted.

The cryptosystem selection unit 303 may be configured to adjust the interval (update interval) for changing (updating) the selected cryptosystem according to the synchronization accuracy with another communication device 400. For example, the cryptosystem selection unit 303 may adjust the update interval so as to change the cryptosystem at shorter intervals as the synchronization accuracy between the communication device (communication device 300) and another communication device 400 is higher. Further, for example, the cryptosystem selection unit 303 may adjust the update interval so as to update the cryptosystem at a longer interval as the accuracy of synchronization between the communication device (communication device 300) and another communication device 400 is lower.

The cryptosystem selection unit 303 may further be configured to perform processing of agreeing cryptosystems to be used with other communication devices 400.

The cryptosystem selection unit 303 configured as described above can also be considered as one concrete example that can realize the cryptosystem selection unit 101 according to the first example embodiment.

The key generation unit 304 (key generation means) generates an encryption key used in the cryptosystem selected by the cryptosystem selection unit 303. For example, when a cryptosystem using an encryption key of a specific key length is selected by the cryptosystem selection unit 303, the key generation unit 304 generates an encryption key of the specific key length.

In the case of the present example embodiment, the key generation unit 304 generates the encryption key by using the clock information provided from the clock generation unit 302. More specifically, the key generation unit 304 may generate the encryption key by using the clock information and the device information stored by the device-status management unit 301.

The method by which the key generation unit 304 generates the encryption key is not particularly limited, and an appropriate method may be selected. The key generation unit 304 may generate, for example, a random number by using a pseudo random number generator which is cryptologically confirmed to be safe and by using selection information selected from at least a part of the device information and clock information as a seed, and provide the random number as an encryption key. In addition, for example, the key generation unit 304 may provide, as an encryption key, a result of encrypting the clock information by using an encryption algorithm which is cryptologically confirmed to be safe and by using the selection information as a key. In addition, the key generation unit 304 may calculate a hash value of selection information and clock information by using an appropriate hash function, and may provide the hash value as an encryption key. As a result, the key generation unit 304 can generate different encryption keys according to the selection information and the clock information. Note that, when a plurality of communication devices have common device information, the communication devices 300 can generate the same encryption keys by using the same clock information and the same device information.

As another example, the key generation unit 304 may generate an encryption key by using, for example, clock information and information (seed of key) provided from the outside of the communication device 300.

The key generation unit 304 may be configured to change (update) the encryption key at an appropriate timing. By changing (updating) the encryption key by the key generation unit 304, it is possible to appropriately maintain the security of the encryption communication. The key generation unit 304 may generate an encryption key at a specific timing (for example, a timing related to the update interval of the cryptosystem adjusted by the device-status management unit 301), and provide the generated encryption key to the cryptographic processing unit 305.

When the communication device 300 and another communication device 400 are synchronized with high accuracy, the respective clock information is synchronized. In this case, each communication device can update the encryption key at the same (or substantially the same) timing, and it is not necessary to distribute the updated key.

When the synchronization accuracy between the communication device 300 and another communication device 400 is low, there is a difference in each clock information. In this case, there is a possibility that the key update timing or the generated encryption key may differ between the communication device 300 and the other communication device 400. In such a situation, when updating the encryption key, the communication device 300 (e.g., the device-status management unit 301) may synchronize the clock information with another communication device 400 and update the encryption key by using the synchronized clock information.

Note that the communication device 300 may be configured to distribute the updated encryption key to another communication device 400 as necessary. The method of safely distributing the encryption key may be realized by using a well-known technique, for example.

The cryptographic processing unit 305 (cryptographic processing means) executes cryptographic processing by the cryptosystem selected by the cryptosystem selection unit 303 by using the encryption key generated by the key generation unit 304.

Specifically, the cryptographic processing unit 305 receives the encrypted communication data from the communication unit 306 (described later), and decrypts the communication data by using the key data generated by the key generation unit 304. The cryptographic processing unit 305 may provide the decrypted communication data to the data transfer unit 307 (described below). In addition, the cryptographic processing unit 305 encrypts the communication data of plain-text provided from the data transfer unit 307 by using the encryption key generated by the key generation unit 304. The cryptographic processing unit 305 may provide the encrypted communication data to the communication unit 306.

Figure 4:
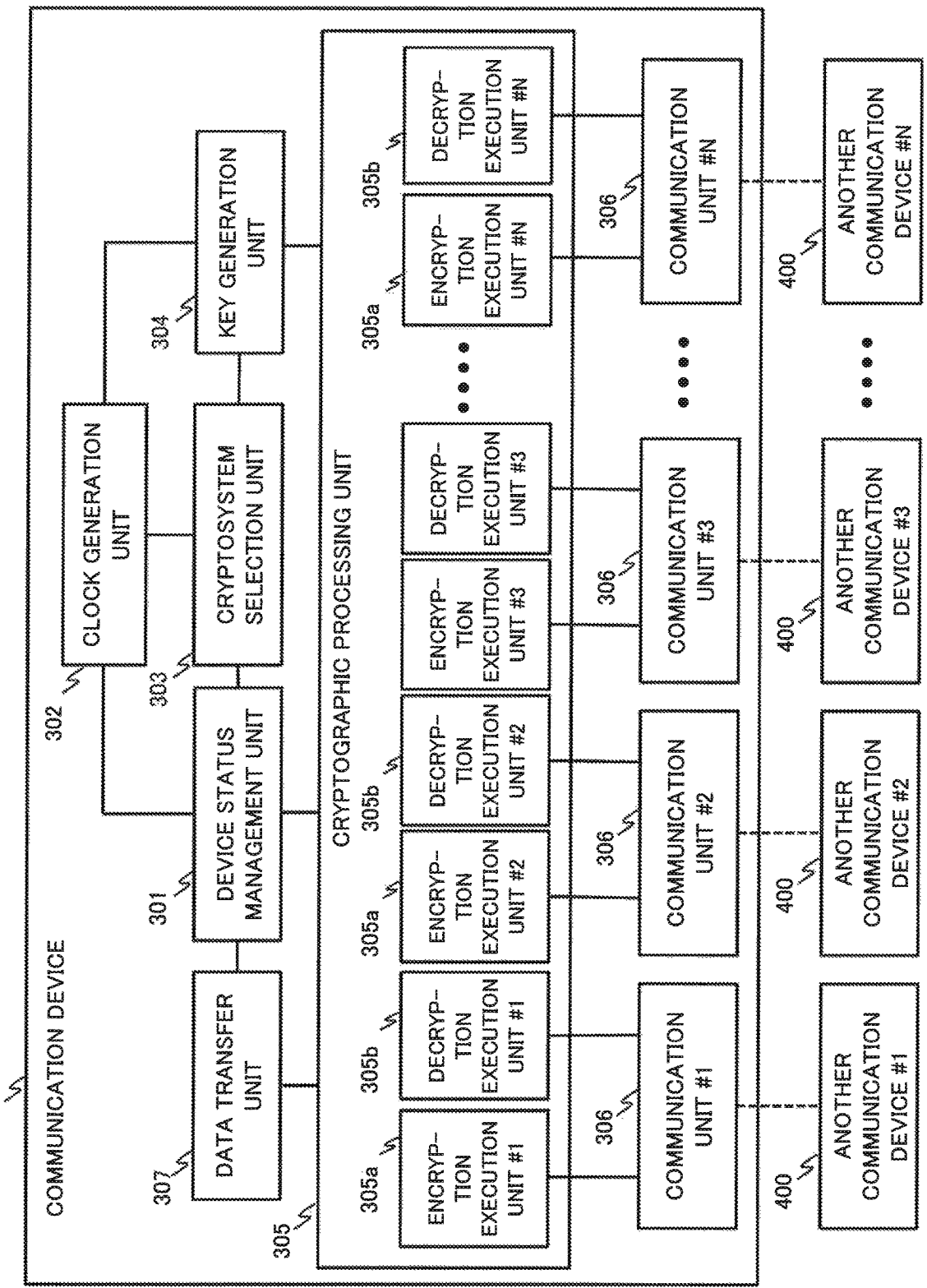
FIG. 4 is a block diagram illustrating an example of another functional configuration of the communication device according to the second example embodiment of the present disclosure.

When there are a plurality of communication units 306, for example, as exemplified in FIG. 4, the cryptographic processing unit 305 may be configured to execute cryptographic processing in parallel for each communication unit 306. For example, an encryption execution unit 305*a* executes processing of encrypting the communication data of plain-text by using the encryption key. Further, a decryption execution unit 305*b* receives the encrypted communication data from the communication unit 306, and decrypts the communication data by using the encryption key. The encryption execution unit 305*a* and the decryption execution unit 305*b* may be realized as software programs such as threads, processes, tasks, or the like. Alternatively, the encryption execution unit 305*a* and the decryption execution unit 305b may be realized as hardware (circuit elements) capable of executing processes in parallel, for example.

The cryptographic processing unit 305 configured as described above can also be considered as one concrete example that can realize the cryptographic processing unit 102 according to the first example embodiment.

The communication unit 306 (communication means) transmits and receives communication data encrypted by the cryptographic processing unit 305 to and from another communication device 400. More specifically, the communication unit 306 receives the encrypted communication data from the cryptographic processing unit 305 and transmits it to another communication device 400. The communication unit 306 provides the encrypted communication data received from another communication device 400 to the cryptographic processing unit 305.

The communication device 300 may include a plurality of communication units 306. Each communication unit 306 may respectively transmit and receive communication data to and from another different communication device 400. That is, the communication unit 306 may relate one-to-one with another communication device 400 through which the communication unit 306 transmits and receives communication data. Alternatively, one communication unit 306 may be communicatively connected to a plurality of other communication devices 400.

The communication unit 306 may be configured to be able to measure a delay occurring in a communication path with another communication device 400 to and from which the communication unit 306 transmits and receives communication data, as necessary. The method of measuring the delay in the communication path may be realized by adopting, for example, a well-known technique.

The data transfer unit 307 (data transfer means) executes transfer processing relating to communication data. For example, the data transfer unit 307 analyzes the communication data of plain-text provided from the cryptographic processing unit 305, and executes processing such as routing or switching on the communication data.

The data transfer unit 307 may be configured to receive data generated inside or outside the communication device 300, make the data be encrypted by the cryptographic processing unit 305, and transmit it to another communication device 400 via the communication unit 306.

Hardware Configuration

Figure 6:
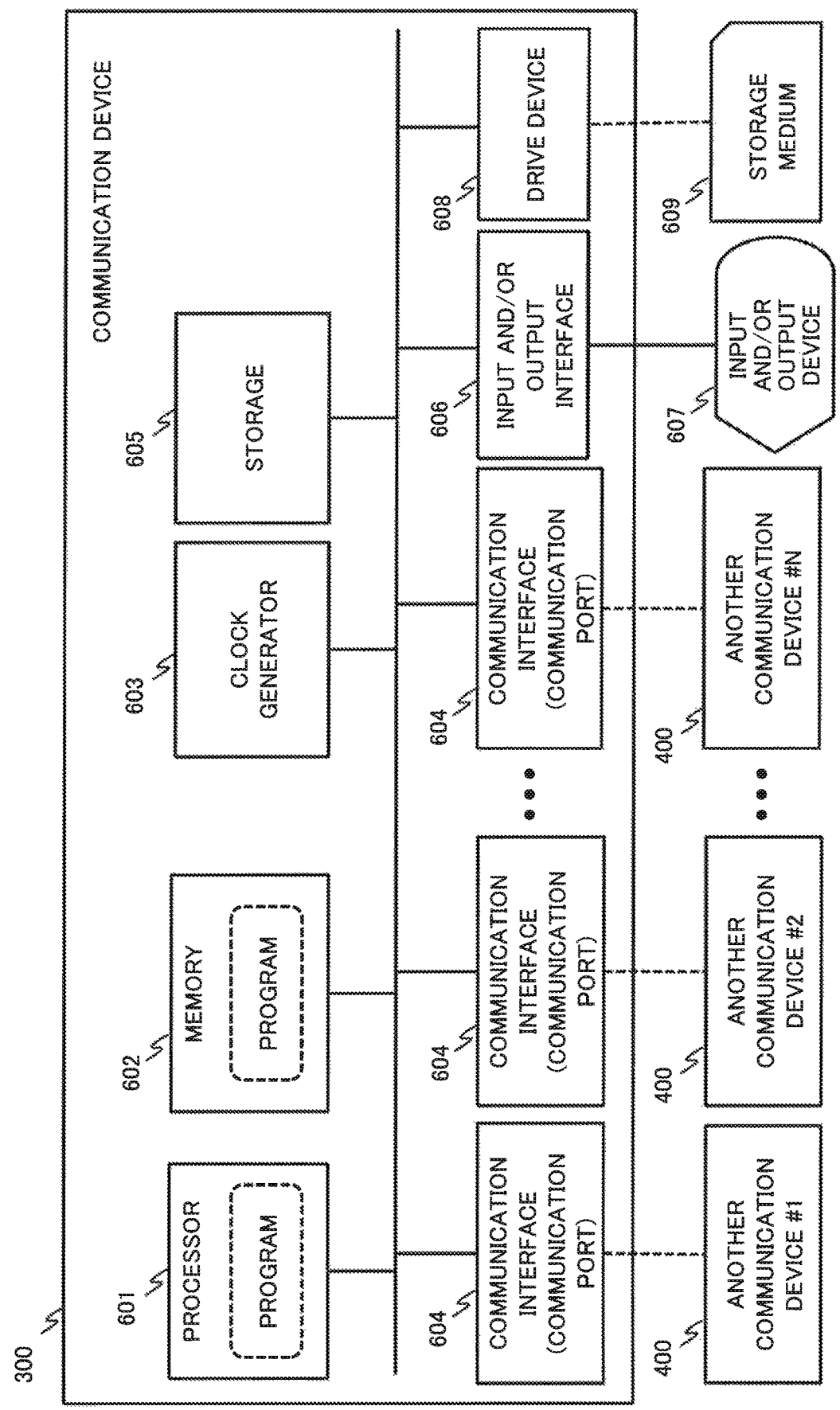
FIG. 6 is an explanatory diagram illustrating a specific example of a hardware configuration capable of realizing the communication device according to the second example embodiment of the present disclosure.
Figure 7:
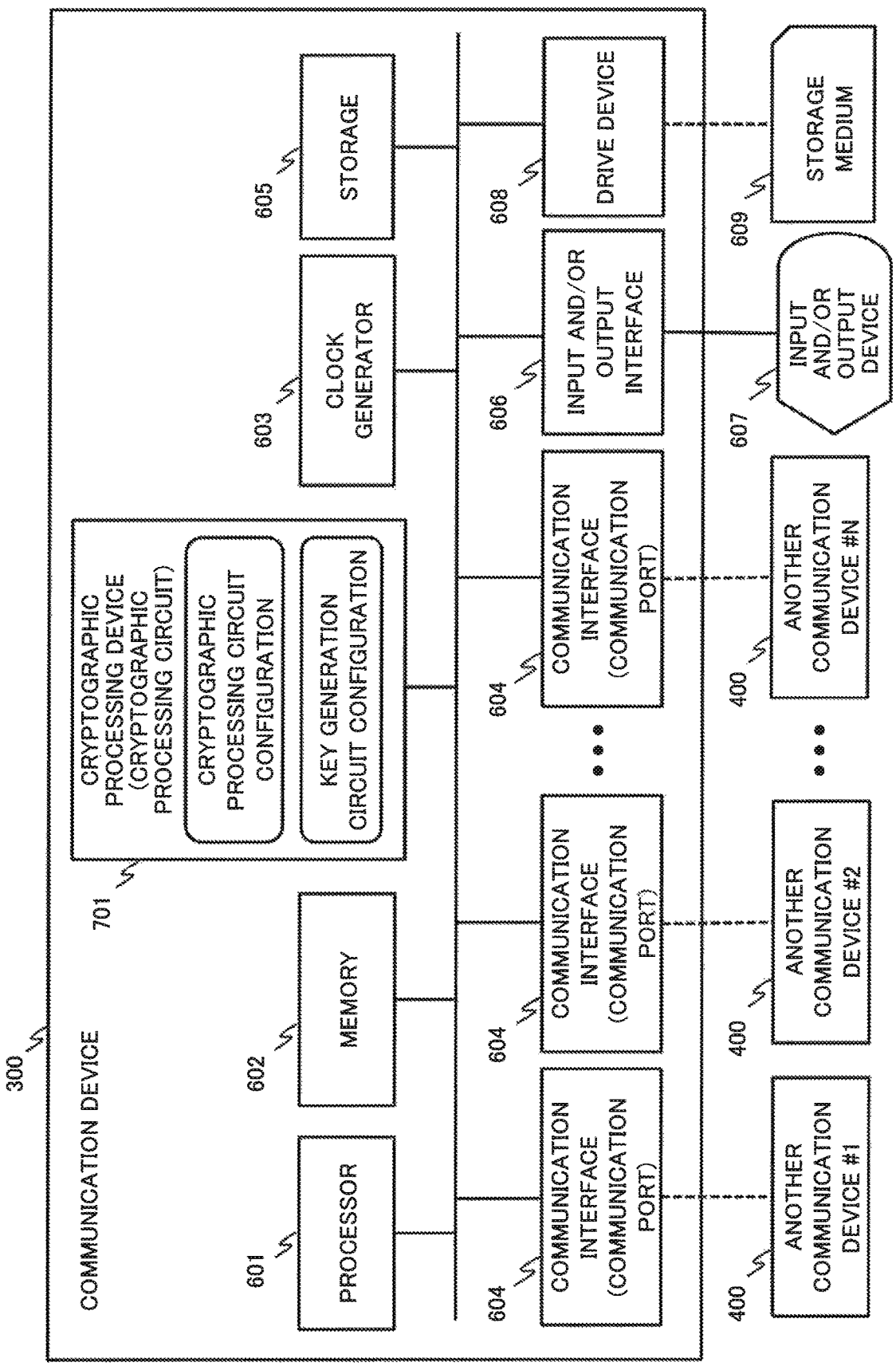
FIG. 7 is an explanatory diagram illustrating another specific example of a hardware configuration capable of realizing the communication device according to the second example embodiment of the present disclosure.
Figure 8:
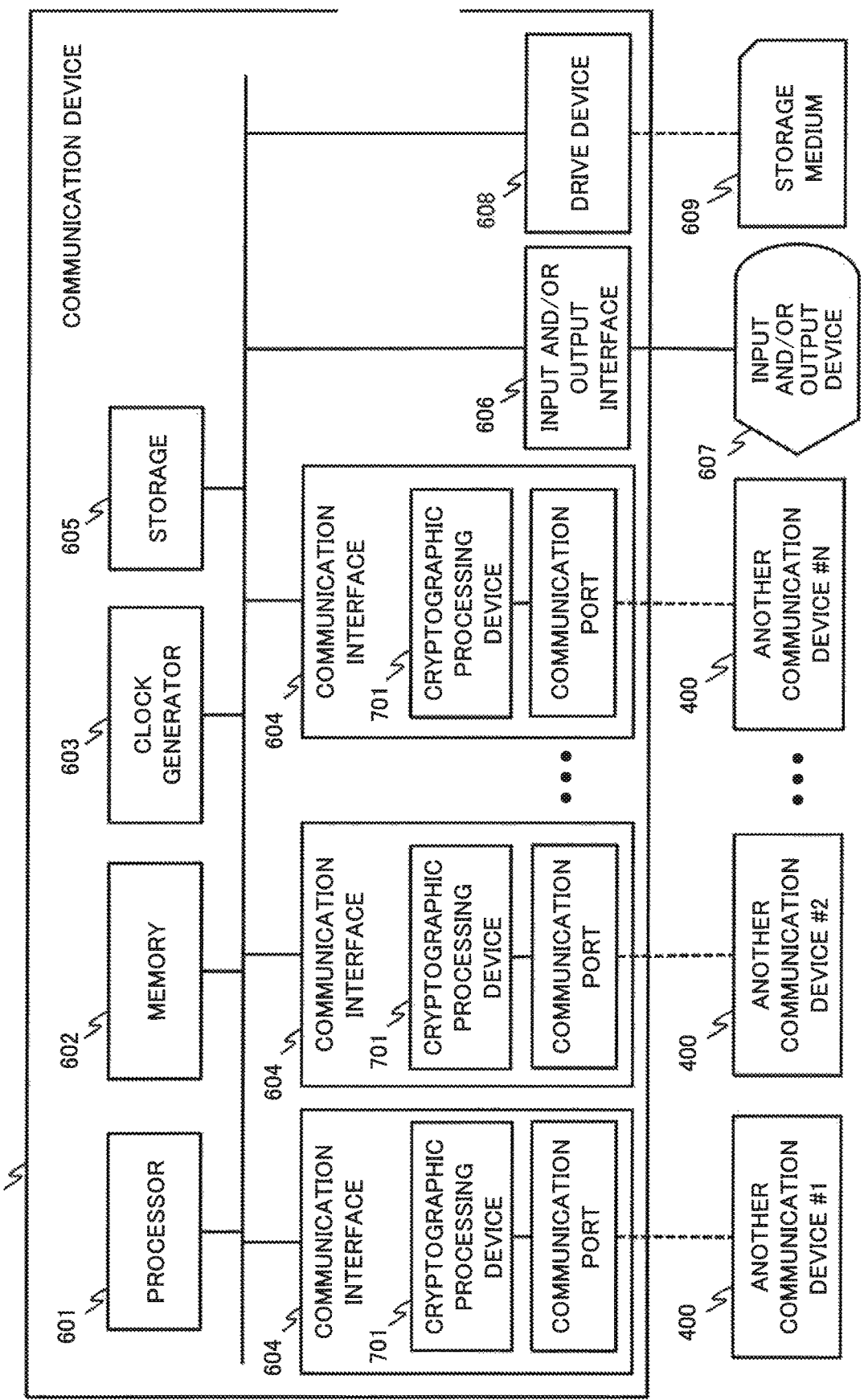
FIG. 8 is an explanatory diagram illustrating still another specific example of a hardware configuration capable of realizing the communication device according to the second example embodiment of the present disclosure.

A specific example of a hardware configuration capable of realizing the communication device 300 having the above-described functional configuration will be described with reference to FIG. 6 to FIG. 8, Note that the hardware illustrated in FIG. 6 to FIG. 8 is a specific example in which the communication device 300 can be implemented, and the hardware capable of realizing the communication device 300 is not limited thereto. Further, the hardware configuration illustrated in FIG. 6 to FIG. 8 may be realized by physical hardware or may be realized by virtualized hardware. Hereinafter, the configuration exemplified in each drawing will be described.

The communication device 300 exemplified in FIG. 6 includes a processor 601, a memory 602, a clock generator 603, and a communication interface 604 including a communication port. The communication device 300 may further include a storage 605, an input and/or output interface 606, and a drive device 608. These constituent elements are mutually connected via, for example, an appropriate communication line (communication bus or the like).

Each component of the communication device 300 exemplified in FIG. 6 to FIG. 8 may be realized by, for example, a circuitry capable of providing the respective functions. Such a circuit configuration includes, for example, an integrated circuit such as a System on a Chip (SoC), a chip set realized by using the integrated circuit, and the like. In this case, the data stored by the components of the communication device 300 may be stored in, for example, an area of a Random Access Memory (RAM) or a flash memory which are integrated as an SoC, or a storage device (a semiconductor storage device or the like) connected to the SoC. Each constituent element will be described below.

The processor 601 may be a general-purpose CPU or a microprocessor, or may be a logic circuit realized by using a programmable component. The processor 601 executes processing according to the software program read into the memory 602.

The memory 602 is, for example, a memory device such as a RAM that can be referred to from the processor 601. In the memory 602, for example, a software program capable of realizing each constituent element of the above-described communication device 300 is stored, Each software program executed by the processor 601 may be configured to be able to mutually transmit various kinds of data by an appropriate method such as shared memory or inter-process communication.

The clock generator 603 is, for example, a device including a device (for example, atomic clock etc.) that generates a clock signal. Further, the clock generator 603 may include a device (for example, a GPS unit, a standard radio-wave receiving unit, or the like) for acquiring time information. The clock generator 603 may provide the generated clock signal (or time information) to other constituent elements. For example, the clock generation unit 302 may be realized by a software program, which is executed by the processor 601, using the clock signal generated by the clock generator 603. Note that, to the clock generator 603, an interface (signal input unit) capable of inputting a synchronization signal may be provided.

The communication interface 604 is a device including a communication port connected to a communication network and a controller for controlling transmission and reception of data. When the communication device 300 is connected to a wired communication line, a communication cable may be connected to the communication interface. When the communication device 300 is connected to a wireless communication line, an antenna for communication or the like may be connected to the communication interface. For example, the communication unit 306 may be realized by using the communication interface 604.

The storage 605 is a non-transitory storage device, for example, such as a magnetic disk drive or a semiconductor storage device based on a flash memory. The storage 605 can store various kinds of software programs, data used by the software programs or the like. For example, the device information stored by the device-status management unit 301, the information representing the accuracy of synchronization, and the like may be stored in the storage 605.

The input and/or output interface 606 is, for example, a device that controls input and/or output with the input and/or output device 607. The input and/or output device 607 may be, for example, a device (a display, an operation button, a voice input and/or output device, or the like) that realizes an interface between the communication device 300 and a user. Whether or not the communication device 300 includes the input and/or output interface 606 may be appropriately selected.

The drive device 608 is, for example, a device that processes reading and writing of data to and from a storage medium 609 to be described later. Note that whether or not the communication device 300 includes the drive device 608 may be appropriately selected.

The storage medium 609 is a storage medium capable of recording data, for example, an optical disc, a magneto-optical disc, a semiconductor flash memory, or the like. The above software program may be recorded in the storage medium 609 and may be appropriately stored in the storage 605 through the drive device 608 at shipping stage, operation stage, or the like of the communication device 300. In the above case, the various software programs may be installed in the communication device 300 by using an appropriate tool. In the above case, the constituent elements of the communication device 300 can be regarded as being constituted by codes constituting each of the software programs, or by a computer-readable storage medium in which the codes are recorded.

Note that, when manually setting an encryption key (for example, a pre-shared key) for each communication device, the encryption key may be distributed to each communication device 300 by using the storage medium 609.

The communication device 300 is not limited to the above, and can be realized by a configuration exemplified in FIG. 7. FIG. 7 further includes a cryptographic processing device 701 in addition to the configuration of FIG. 6.

The cryptographic processing device 701 is a device including a circuit configuration for executing cryptographic processing, a circuit configuration for executing key generation processing, and the like. The cryptographic processing device 701 may be realized by using, for example, a field-programmable gate array (FPGA) or an application specific integrated circuit (ASIC).

For example, a plurality of circuits capable of executing the processing of the encryption execution unit 305a and the decryption execution unit 305b exemplified in FIG. 4 may be implemented on the cryptographic processing device 701. For each communication port of the communication interface 604, these circuits may execute cryptographic processing on communication data transmitted and received at the communication port in parallel.

Note that the cryptographic processing device 701 may be implemented in the communication interface 604, for example, as exemplified in FIG. 8, In this case, the cryptographic processing device 701 implemented on each communication interface 604 executes cryptographic processing on the communication data transmitted and received at the communication port included in the communication interface 604.

Operation

The operation of the communication device 300 configured as described above will be described.

Synchronization of Clock Information

Hereinafter, the operation of adjusting the difference (error) of the clock information used for generating the encryption key between communication devices (for example, between the communication device 300 and the communication device 400) will be described. Note that the processing of adjusting the difference of clock information may be referred to as clock information synchronization processing in some cases.

As explained above, in the present example embodiment, the encryption key is generated by using the clock information. For example, when the clock information in a certain communication device 300 (described as "communication device X") and another communication device 400 (described as "communication device Y") are synchronized, each communication device can generate a common encryption key.

The communication device 300 may periodically adjust the clock information or adjust the clock information at a predetermined timing determined by the setting value or the like. Further, the communication device 300 may control the frequency of adjusting the clock information according to the determination result of the synchronization accuracy to be described later.

Figure 9:
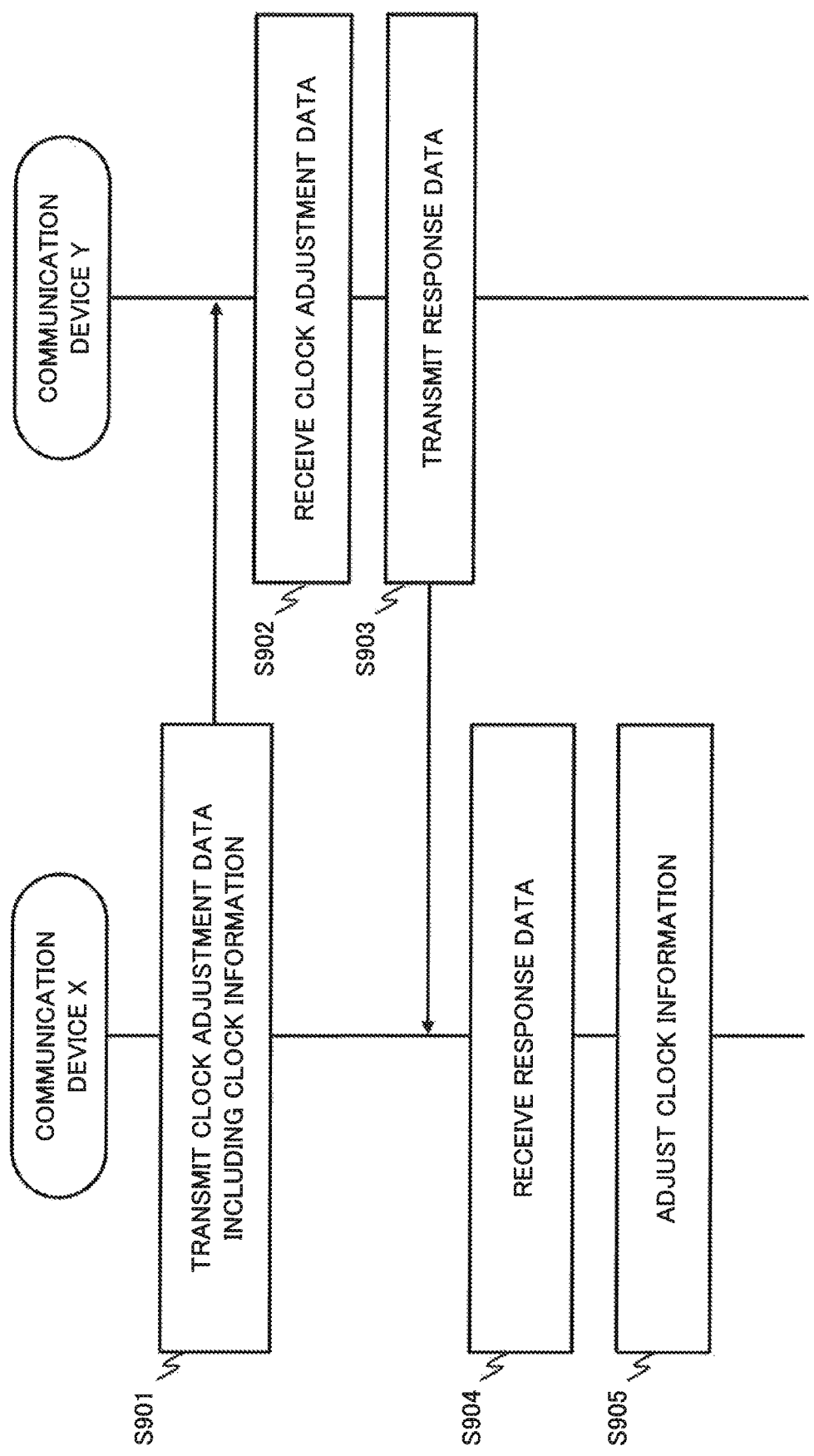
FIG. 9 is a sequence diagram illustrating an operation (an example of synchronizing processing of clock information) of the communication device according to the second example embodiment of the present disclosure.

As a method for the communication device 300 to synchronize the clock information, various methods can be adopted. As an example of such a method, a method of transmitting and receiving communication data for synchronization (hereinafter may be referred to as "clock adjustment data") between communication devices is considered. FIG. 9 is a sequence diagram illustrating an example of an operation of synchronizing clock information by transmitting and receiving clock adjustment data. Each constituent element (in particular, the device-status management unit 301 or the like) of the communication device 300 appropriately executes the processing, therefor the processing of each step exemplified in FIG. 9 is advanced.

As illustrated in FIG. 9, the communication device X transmits clock adjustment data including clock information of the communication device X to the communication device Y (step S901), The clock adjustment data may further include, for example, information representing the accuracy of the clock information generated by the communication device X in addition to clock information of the communication device X. The information representing the accuracy of the clock information may be, for example, information representing accuracy itself of the clock information or information representing a constituent element (for example, an oscillator such as atomic clock) that generates clock information in the communication device X. The communication device X may store information (for example, time, clock information, or the like) representing the timing at which the clock adjustment data is transmitted to the communication device Y.

When an encrypted communication path with the communication device Y is established, the communication device X may transmit the clock adjustment data to the communication device Y by using the encrypted communication path. Further, when the communication device X and the communication device Y store the pre-shared key, the communication device X may transmit the clock adjustment data encrypted by using the pre-shared key to the communication device Y. In this case, the pre-shared key is used for cryptographic processing related to clock adjustment data and not used for encryption of (normal) communication data other than clock adjustment data. Since the total amount of cipher-text data encrypted by using the pre-shared key is considered to be relatively small, it is unlikely that an issue related to safety of encryption communication will be caused by compromise of the pre-shared key or the like.

The communication device Y receives the clock adjustment data (step S902), and transmits response data regarding to the clock adjustment data (step S903). For example, clock information in the communication device Y may be included in the response data. In addition, the response data may further include, for example, information representing the accuracy of the clock information generated by the communication device Y. The information representing the accuracy of the clock information may be, for example, information representing accuracy of the clock information itself or information representing a constituent element (for example, an oscillator such as an atomic clock) that generates clock information in the communication device Y.

The communication device X receives the response data from the communication device Y (step S904).

The communication device X adjusts the clock information in the communication device X according to the clock information in the communication device Y included in the response data (step S905). More specifically, the communication device X may calculate the difference between the clock information of the communication device Y included in the response data and the clock information of the communication device X, and may adjust the clock information generated by the communication device X based on the difference. In this case, for example, the communication device X may control the clock generation unit 302 so that the clock information generated in the clock generation unit 302 is synchronized with the communication device Y. As a result, the communication device X can generate a clock signal synchronized with the communication device Y.

Through the above processing, the communication device X can generate clock information synchronized with the communication device Y at least at the timing at which the above processing is executed.

Note that the method by which the communication device X and the communication device Y synchronize the clock information is not limited to the above, and other appropriate methods may be adopted.

Determination of the Synchronization Accuracy

Hereinafter, processing for determining the accuracy of synchronization between the communication device 300 (communication device X) and another communication device 400 (communication device Y) will be described.

In the present example embodiment, since the encryption key is generated by using the clock information, as there are more timings at which the clock information of each communication device (communication device 300, communication device 400) is synchronized, each communication device can change the encryption key frequently. In addition, when there are less timings at which the clock information is synchronized, there is a possibility that the timing at which the communication device 300 can change the encryption key is limited.

For example, if the communication device 300 can easily (frequently) execute the synchronization processing, it is considered that there are many timings at which the clock information is synchronized. In addition, if the communication device 300 is capable of generating clock information by using a high accuracy clock signal, it is considered that the difference (for example, chronological error) after the clock information is once synchronized is small, and accordingly, there are many timings at which the clock information is synchronized. On the other hand, when it is difficult to execute the synchronization processing, or when the accuracy of the generated clock information is low, there is a possibility that there are relatively fewer timings at which the clock information is synchronized.

In view of the above, in the present example embodiment, the communication device 300 determines the synchronization accuracy according to the synchronization status of the clock information. More specifically, as there are more timings at which the clock information is synchronized, there are more timings at which the cryptosystem can be changed, so that the synchronization accuracy is determined to be high. Further, when there are fewer timings at which the clock information is synchronized, there are fewer timings at which the cryptosystem can be changed, so that the synchronization accuracy is determined to be low.

Various methods can be adopted as a method for the communication device X to determine the synchronization accuracy. As an example of such a method, the communication device X may determine the synchronization accuracy based on setting information given in advance by a user or the like. More specifically, for example, the user of the communication device X sets, in advance, the synchronization accuracy with another communication device Y in the communication device X. In this case, the user can appropriately set the synchronization accuracy between the communication devices in consideration of the arrangement environment of each communication device Y, the network environment, and the like. For example, the communication device X may set the information representing the accuracy of synchronization with another communication device Y to the synchronization accuracy 502 illustrated in FIG. 5 based on such setting.

As another example, the communication device X may determine the accuracy of synchronization based on the result of the synchronization processing described above. More specifically, the communication device X may determine the synchronization accuracy according to a magnitude of the difference in the clock information, the configuration of another communication device Y, response time of the synchronization processing for another communication device Y, and the like.

Hereinafter, such a method will be described with reference to a specific example illustrated in FIG. 10.

The communication device X may consider the difference in clock information with the communication device Y, for example, when determining the synchronization accuracy with the communication device Y. The difference of the clock information is acquired by calculating the difference between the clock information included in the response data received from the communication device Y and the clock information of the communication device X, for example. The communication device X may determine the synchronization accuracy based on the result of comparing the difference between the clock information with the communication device Y and a certain reference difference value. When the difference in the clock information is large, for example, there is a possibility that it is difficult to synchronize the communication device X and the communication device Y with high accuracy. Note that the reference difference value may be given to the communication device X in advance as a setting value or the like.

Further, when determining the synchronization accuracy with the communication device Y, the communication device X may consider, for example, information representing the accuracy of the clock information included in the received response data. The communication device X may determine the synchronization accuracy based on, for example, a result of comparing information representing the accuracy of the clock information included in the response data with the reference accuracy. Such reference accuracy may be Oven to the communication device X in advance as a set value or the like. Note that the communication device X may consider whether the clock generation unit 302 in the communication device Y includes a configuration (for example, atomic clock, and the like) capable of generating high accuracy clock information. When the communication device Y can generate high accuracy clock information, there is a possibility that the communication device Y can maintain a status in which the difference of the clock information is small. In this case, to the communication device X, information representing the accuracy of the clock information capable of generating the constituent element for generating the clock information may be given in advance as a setting value or the like.

Further, when determining the synchronization accuracy with the communication device Y, the communication device X may consider the result of comparing the response time of the synchronization processing with the communication device Y and a reference response time, for example. The response time of the synchronization processing can be acquired, for example, by measuring the time from when the communication device X transmits the clock adjustment data in step S901 to when the communication device x receives the response data in step S904. When the response time is long, for example, there is a possibility that it may be difficult to frequently execute the synchronization processing between the communication device X and the communication device Y. The reference response time may be given to the communication device X in advance as a setting value or the like.

In view of the above, the communication device X may determine, for example, the synchronization accuracy with the communication device Y as follows. That is, for example, when the difference of the clock information is smaller than the reference difference value and the response time of the synchronization processing is shorter than the reference response time, the communication device X may determine that the communication device X can appropriately execute the synchronization processing with the communication device Y, in this case, the communication device X may determine that the synchronization accuracy with the communication device Y is "high synchronization".

For example, when the difference of the clock information is smaller than the reference difference value and the communication device Y is configured to generate high accuracy clock information, the communication device X may determine that it is possible to maintain a status in which the difference of the clock information with the communication device Y is small. In this case, the communication device X may determine that the synchronization accuracy with the communication device Y is "high synchronization".

For example, when the response time of the synchronization processing is longer than the reference response time and the communication device Y is configured to generate low accuracy clock information, the communication device X may determine that the synchronization accuracy with the communication device Y is "low synchronization". When the difference of the clock information is larger than the reference difference value and the response time of the synchronization processing is longer than the reference response time, the communication device X may also determine that the synchronization accuracy with the communication device Y is "low synchronization", When the difference of the clock information is larger than the reference difference value and the communication device Y generates low accuracy clock information, the communication device X may also determine that the synchronization accuracy with the communication device Y is "low synchronization". In these cases, it is because that it is considered that it is difficult for the communication device X and the communication device Y to execute the synchronization processing, or it is difficult to maintain a status in which the difference of the clock information (for example, a chronological error) is small.

As a modification of the above, the communication device X may determine the synchronization accuracy based on, for example, the difference between the clock information and the configuration of the communication device Y regardless of the response time of the synchronization processing. For example, when the difference of the clock information is smaller than the reference difference value and the communication device Y is capable of generating high accuracy clock information, the communication device X may determine that the synchronization accuracy with the communication device Y is "high synchronization". In the cases other than the above, the communication device X may determine that the synchronization accuracy with the communication device Y is "low synchronization".

For example, when the synchronization processing with the communication device Y cannot be executed (for example, when the communication device X cannot transmit the clock adjustment data), the communication device X determines that the synchronization accuracy with the communication device Y is "asynchronous". Further, for example, when the communication device X cannot receive a response from the communication device Y, the communication device X may also determine that the synchronization accuracy with the communication device Y is "asynchronous".

For example, the communication device X may set the information representing the accuracy of synchronization with another communication device Y to the synchronization accuracy 502 illustrated in FIG. 5 based on the above determination result.

Selection of Cryptosystem

Figure 11:
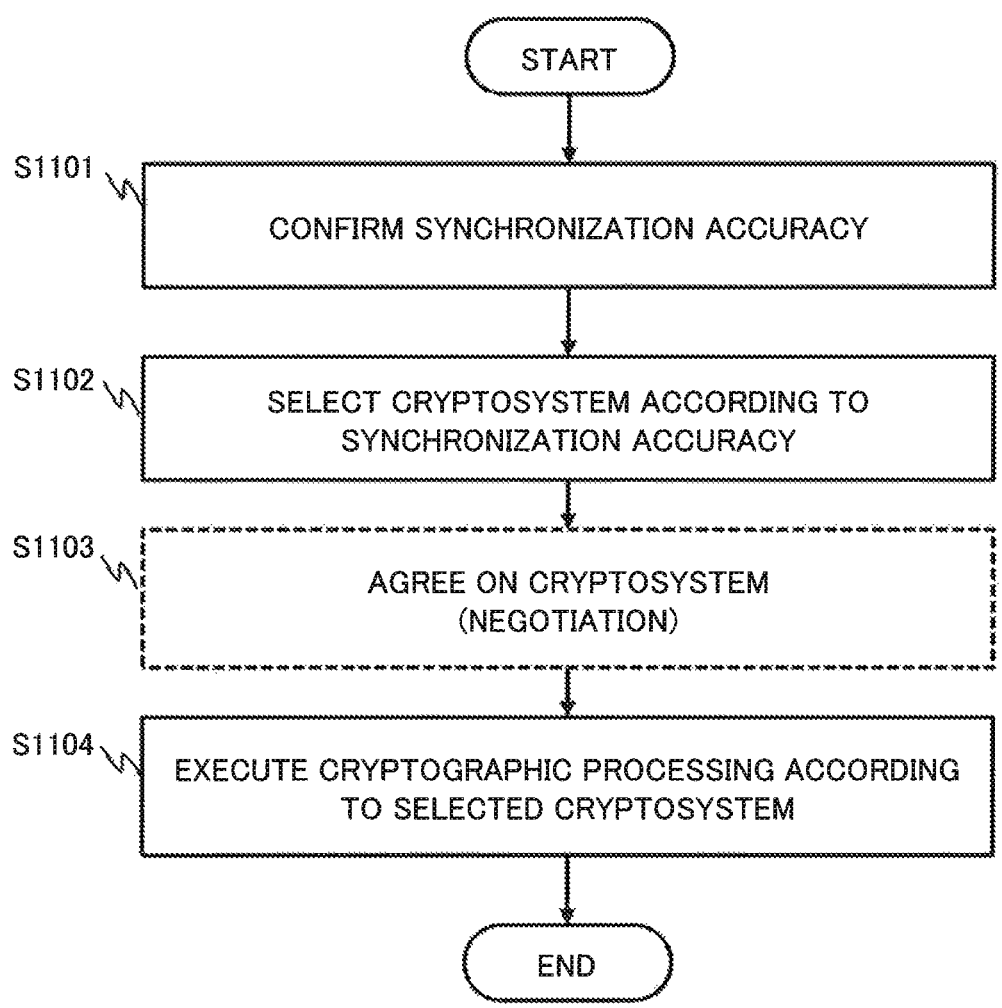
FIG. 11 is a flowchart illustrating an operation (an example of selection operation of cryptosystem) of the communication device according to the second example embodiment of the present disclosure.

Hereinafter, the operation of the communication device X for selecting cryptosystem will be described with reference to the flowchart illustrated in FIG. 11.

The communication device X confirms the synchronization accuracy with the communication device Y (step S1101). For example, the communication device X (cryptosystem selection unit 303) may confirm the synchronization accuracy (502 in FIG. 5) stored by the device-status management unit 301.

The communication device X selects a cryptosystem used for encryption communication with the communication device Y according to the synchronization accuracy confirmed in step S1101 (step S1102). When "high synchronization" is set as the synchronization accuracy for the communication device Y, the communication device X (cryptosystem selection unit 303) may select, for example, a cryptosystem with a relatively light processing load (for example, a cryptosystem in which the safety index of encryption strength is 128 bits). When "low synchronization" is set as the synchronization accuracy for the communication device Y, the communication device X (cryptosystem selection unit 303) may select, for example, a cryptosystem with a relatively high processing load (for example, a cryptosystem in which the safety index of encryption strength is 192 bits). When "asynchronous" is set as the synchronization accuracy for the communication device Y, the communication device X (cryptosystem selection unit 303) may select, for example, a cryptosystem having a higher processing load (for example, a cryptosystem in which the safety index of encryption strength is 256 bits).

In addition, the communication device X may adjust the interval (update interval) for changing the cryptosystem used for encryption communication with the communication device Y according to the synchronization accuracy. When "high synchronization" is set as the synchronization accuracy for the communication device Y, the communication device X (cryptosystem selection unit 303), for example, may set a relatively short interval (for example, in the order of "milliseconds" to "seconds" in time) as the update interval. When "low synchronization" is set as the synchronization accuracy for the communication device Y, the communication device X (cryptosystem selection unit 303) may set, for example, a relatively long interval (for example, in the order of "hours") as the update interval. When "asynchronous" is set as the synchronization accuracy for the communication device Y, for example, the communication device X (cryptosystem selection unit 303) may set, for example, a longer interval as the update interval, or set so as not to change the cryptosystem. The specific update interval can be appropriately selected, for example, by the response time of the synchronization processing, the trial at the design and operation stage, or the like. Note that, when the clock information generated by the clock generation unit 302 represents a counter value, the update interval may be expressed by using the counter value. When the clock information generated by the clock generation unit 302 represents time, such update interval may be expressed by using a length of time (or a point in time).

The communication device X (cryptosystem selection unit 303) may store the information representing the selected cryptosystem and the update interval in association with the communication device Y, and provide them to the key generation unit 304 and the cryptographic processing unit 305. Note that the communication device X (cryptosystem selection unit 303) may calculate the timing to subsequently update the encryption key based on the above update interval and store it as the setting value.

The communication device X (cryptosystem selection unit 303) may execute processing of agreeing with the communication device Y with regard to the cryptosystem selected in step S1102 (step S1103). The communication device X may agree on the cryptosystem and its update interval with the communication device Y by transmitting, for example, data including the selected cryptosystem and the update interval of the cryptosystem to the communication device Y. For example, when the communication device Y can select the cryptosystem and its update interval in the same manner as the communication device X, the communication device X may not execute step S1103. In this case, for example, when executing the synchronization processing, the communication device Y may determine the synchronization accuracy with respect to the communication device X from the difference of the clock information with the communication device X and the information representing the configuration of the communication device X. Then, the communication device Y may appropriately select the cryptosystem and its update interval according to the result of the determination.

The communication device X (cryptographic processing unit 305) executes encryption communication with the communication device Y by using the cryptosystem selected in step S1102. More specifically, for example, the key generation unit 304 generates an encryption key according to the cryptosystem selected in step S1102. The cryptographic processing unit 305 executes cryptographic processing (encryption processing and decryption processing) according to the cryptosystem selected in step S1102 by using the encryption key generated by the key generation unit 304.

Update of Encryption Key

Hereinafter, the processing of updating the cryptosystem by the communication device X will be described. The flowchart illustrated in represents updating processing of the encryption key constituting the cryptosystem as an example of updating the cryptosystem.

Figure 12:
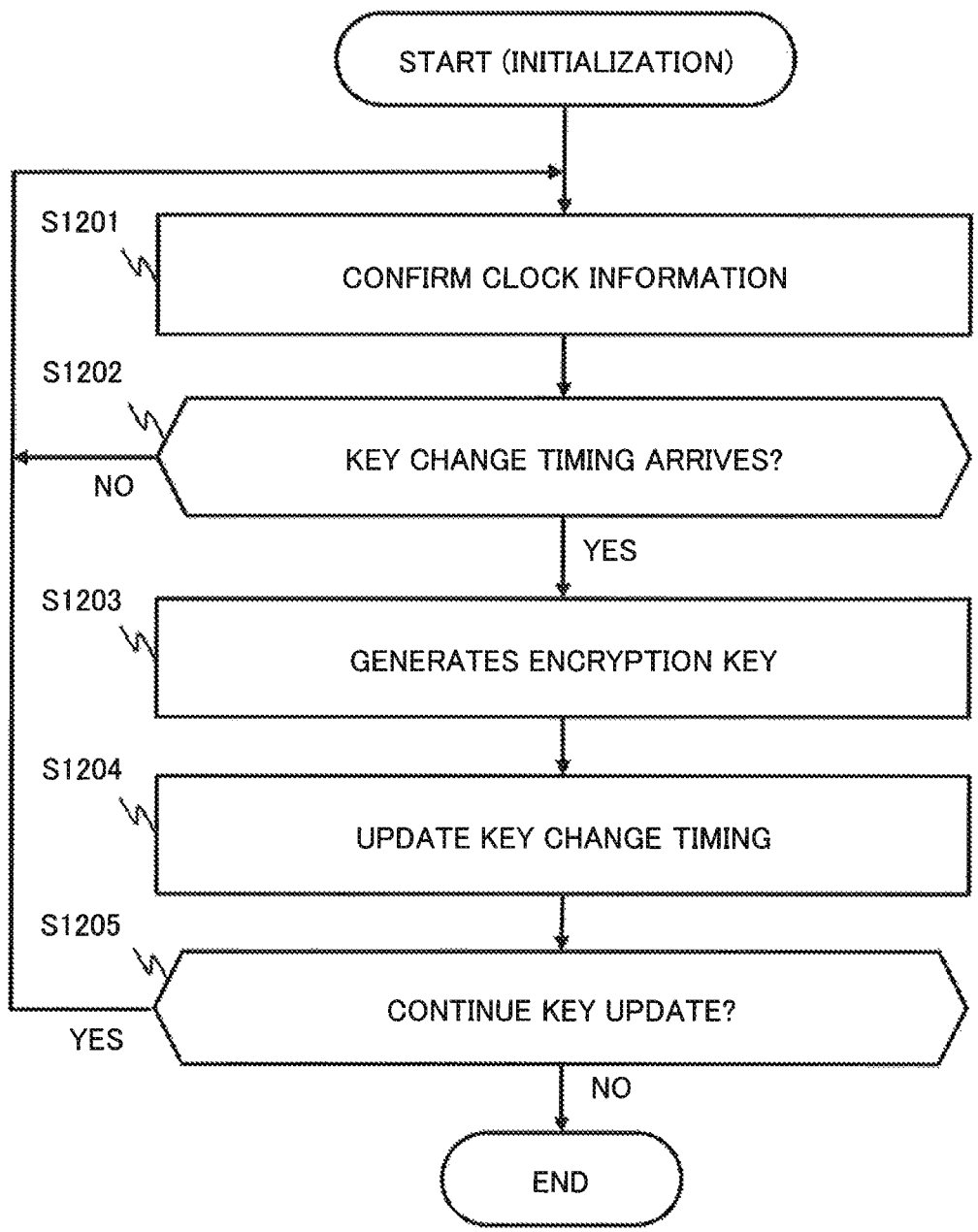
FIG. 12 is a flowchart illustrating an operation (an example of update operation of an encryption key) of the communication device according to the second example embodiment of the present disclosure.

In the present example embodiment, update timing of the cryptosystem may be initialized before executing the processing illustrated in FIG. 12. Such timing of initialization may be, for example, timing at which the communication device X is activated, timing at which the synchronization processing is executed between the communication device X and the communication device Y, or timing at which the cryptosystem between the communication device X and the communication device Y is selected.

The communication device X (cryptosystem selection unit 303) confirms the clock information generated by the clock generation unit 302 (step S1201).

The communication device X (cryptosystem selection unit 303) determines whether or not the key change timing is arrived, based on the clock information confirmed in step S1201 and the stored update interval of the cryptosystem (step S1202).

For example, when the clock information represents a counter value, the communication device X may determine whether or not the key change timing arrives by comparing the counter value included in the clock information with the counter value indicated by the update interval. Alternatively, for example, when the clock information represents time information, the communication device X may determine whether or not the key change timing arrives by comparing the time included in the clock information with the length of time the point in time) represented by the update interval.

When the key change timing arrives (YES in step S1202), the communication device X (key generation unit 304) generates an encryption key (step S1203). For example, the cryptosystem selection unit 303 may notify the key generation unit 304 of the arrival of the key change timing, and the key generation unit 304 may generate the encryption key. When the clock information generated by the communication device (communication device X) is synchronized with the clock information of the communication device Y, the communication device X and the communication device Y can generate common encryption keys. The key generation unit 304 may provide the generated new encryption key to the cryptographic processing unit 305.

When the key change timing does not arrive (NO in step S1202), the key generation unit 304 continues the processing from step S1201.

The key generation unit 304 updates the key change timing (step S1204). For example, the key generating unit 104 may set the next timing at which the encryption key is changed in the setting value indicating the timing of changing the encryption key.

When continuing the processing of updating the encryption key (YES in step S1205), the key generation unit 304 continues the processing from step S1201. When not continuing the processing of updating the encryption key (NO in step S1205), the key generation unit 304 may end the processing.

Through the above-described processing, the key generation unit 304 can change (update) the encryption key at an appropriate timing.

As described above, when the communication device X and the communication device Y update the encryption keys at the timing in which the clock information synchronizes (for example, when changing the cryptosystem at the timing of synchronizing processing of the clock information), the communication device X and the communication device Y can generate common encryption keys. When there is a difference between the clock information of the communication device X and that of the communication device Y, the communication device X may execute processing of delivering the generated encryption key to the communication device Y.

Note that, according to processing similar to the above, it is possible to update not only the encryption key but also the encryption algorithm.

Figure 13:
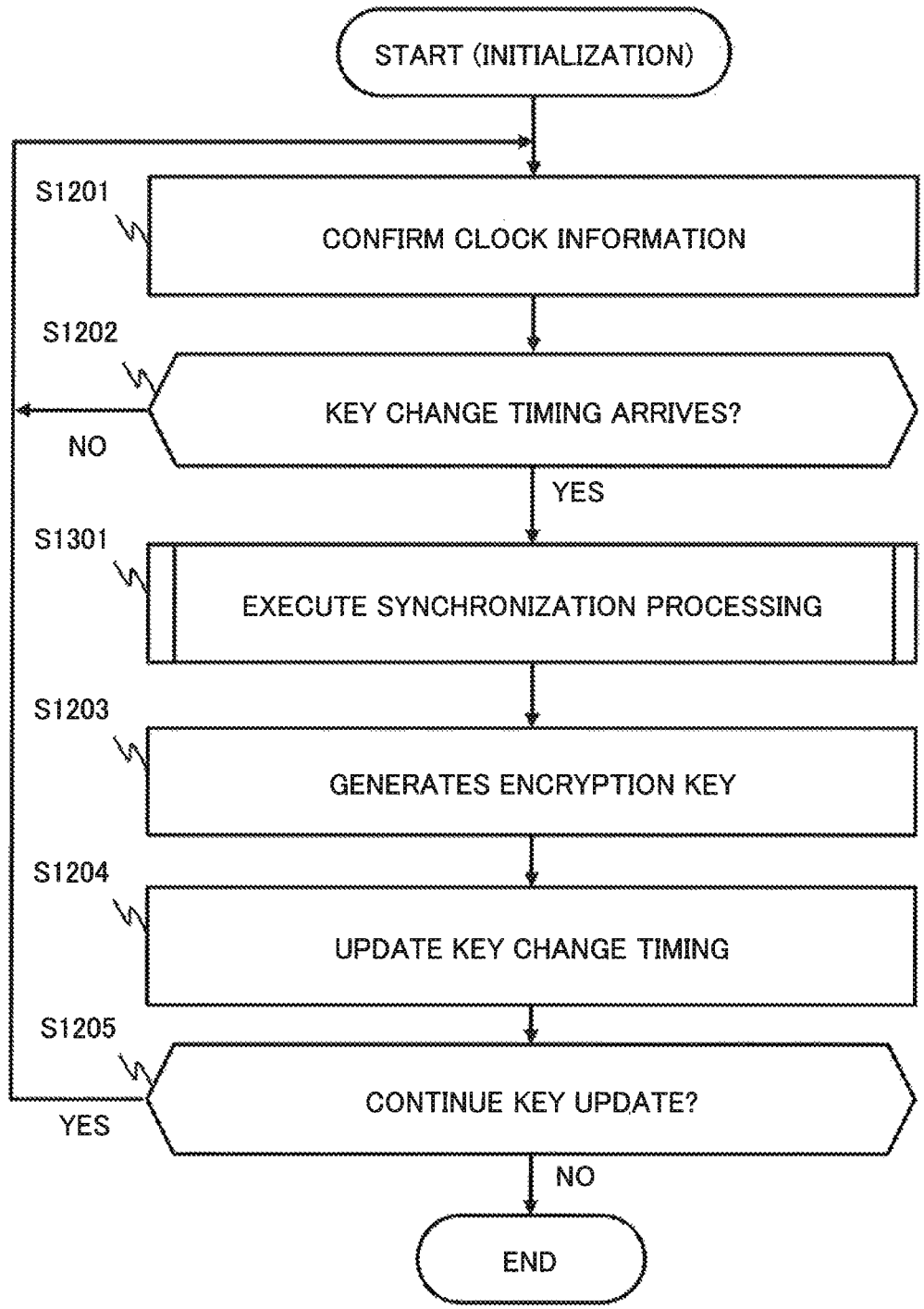
FIG. 13 is a flowchart illustrating an operation (another example of update operation of an encryption key) of the communication device according to the second example embodiment of the present disclosure.

As a modification of the above-described processing, the communication device X may execute processing as illustrated in FIG. 13. In the processing illustrated in FIG. 13, step S1301 is further executed depending on circumstances with respect to the processing illustrated in FIG. 12. The other processing illustrated in FIG. 13 may be similar to that of FIG. 12.

In step S1301, the communication device X may execute synchronization processing with the communication device Y. More specifically, for example, when "low synchronization" is set to the synchronization accuracy (502 in FIG. 5) with the communication device Y, the communication device X (device-status management unit 301) may execute processing of synchronizing the clock information with the communication device Y. The processing of synchronizing the clock information with the communication device Y may be similar to those in the steps S901 to S905 in FIG. 9, for example.

When the synchronization accuracy between the communication device X and the communication device Y is low, though there is a possibility that a difference may occur in the clock information at the timing of changing the encryption key, such difference can be resolved by executing step S1301. As described above, when "low synchronization" is set to the synchronization accuracy between the communication device X and the communication device Y, a relatively long interval is set in the update interval of the cryptosystem. Accordingly, since the synchronization processing in step S1301 is also executed at relatively long intervals, the probability of excessive increase in the processing load (or traffic volume) due to the synchronization processing is considered to be low.

The communication device 300 according to the present example embodiment configured as described above can reduce the influence of the load of cryptographic processing while maintaining the security of encryption communication. The reason is that the communication device 300 can appropriately select a cryptosystem with different load required for cryptographic processing according to whether or not the cryptosystem can be frequently changed with another communication device (i.e., according to the synchronization accuracy).

More specifically, when the cryptosystem can be frequently changed with another communication device (when the synchronization accuracy is high), the communication device 300 can select a cryptosystem with a relatively low processing load and change the cryptosystem at relatively short intervals. As a result, the communication device 300 can reduce the load of cryptographic processing. Further, since the cryptosystem is frequently changed, the amount (size) of cipher-text generated by using a single cryptosystem is also reduced. It is considered that this reduces information used for decryption. Further, even when a single cryptosystem is compromised, since the amount of ciphertext encrypted by using the compromised cryptosystem is relatively small, the scope of the influence caused by compromise of such cryptosystem is limited.

Further, when it is difficult to frequently change the cryptosystem with another communication device (when the synchronization accuracy is low), the communication device 300 selects a cryptosystem which has a relatively high processing load and is difficult to decrypt. As a result, the communication device 300 can maintain the security of the encryption communication.

Modification of Second Example Embodiment

Hereinafter, a modification of the second example embodiment will be described. The hardware and software configuration of the communication device 300 according to the present modification may be similar to those in the second example embodiment explained above.

The communication device 300 according to the present modification differs from the second example embodiment in that the communication device 300 according to the present modification stores information representing the difference between clock information with another communication device 400 and generates an encryption key reflecting the difference. The differences will be described below.

Figure 14:
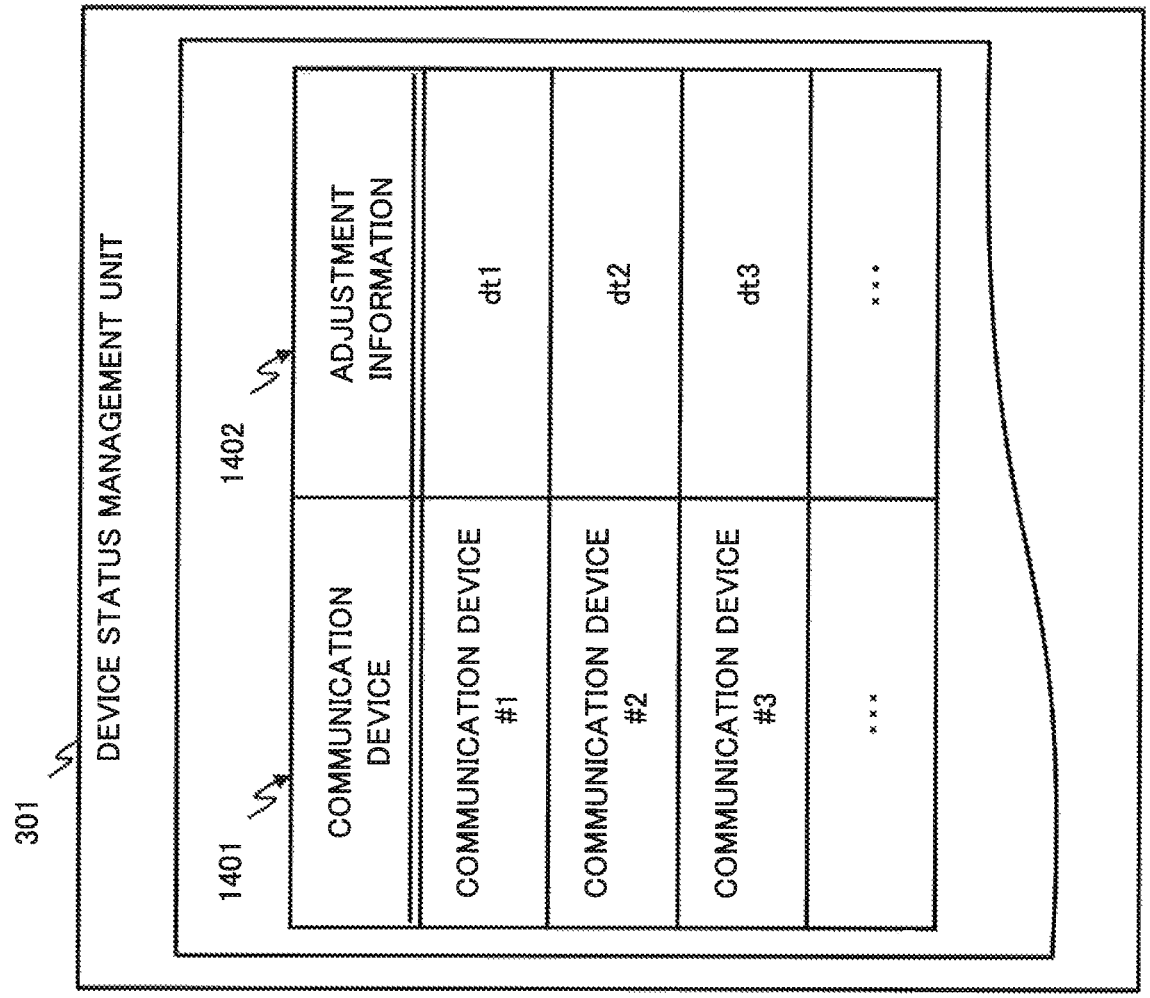
FIG. 14 is an explanatory diagram illustrating an example of information that stores difference in clock information between a communication device and another communication device according to a modification relating to the second example embodiment of the present disclosure.

In the present modification, for example, the device-status management unit 301 holds (stores) another communication device 400 and information representing the difference of the clock information for the communication device 300, which are associated with each other, by using a table as exemplified in FIG. 14. In the table illustrated in FIG. 14, the communication device (1401 in FIG. 14) indicates identification information that can specify another communication device 400. Such identification information may be information similar to those of 501 of FIG. 5. Further, the adjustment information (1402 in FIG. 14) represents the difference in clock information between the communication device 300 and another communication device 400.

In the present modification, for example, when receiving the response data on the clock adjustment data from another communication device 400 (step S904 described above), the device-status management unit 301 may set the extracted difference to the adjustment information illustrated in FIG. 14 (1402 in FIG. 14). In this case, the device-status management unit 301 may not adjust the clock information itself generated by the clock generation unit 302.

In the present modification, the key generation unit 304 calculate the adjusted clock information by using, for example, the adjustment information (1402 in FIG. 14) associated with another communication device 400 and the clock information generated by the communication device (communication device 300). More specifically, the key generation unit 304 may calculate the adjusted clock information by adding (or subtracting) the adjustment information to the clock information generated by the communication device (the communication device 300). The key generation unit 304 generates the encryption key by using the adjusted clock information and the device information.

In the case of the present modification, when the communication device 300 can easily (frequently) execute the synchronization processing, the difference in the clock information between the communication devices can be accurately reflected in the adjustment information stored by the device-status management unit 301. In addition, when the clock information with high accuracy can be generated in each communication device, it is considered that the error of the adjustment information extracted once is small. As a result, in the present modification, generation, updating and the like of the encryption key can be executed by using the clock information of another communication device 400, the clock information estimated by using the clock information generated by the communication device (communication device 300) and the adjustment information.

According to the present modification configured as described above, by storing the individual adjustment information for each another communication device 400, it is possible to execute generation of an encryption key or the like by using the individual clock information for each communication device 300 without adjusting the clock information itself generated by the communication device.

The foregoing is described as an example in which the present disclosure is applied to the above-described exemplary example embodiment. In each of the above example embodiments, an example in which the technology related to the present disclosure is applied to the communication device (100, 300) is described. For example, by operating the communication device (100, 300) according to each of the above example embodiments, a communication method according to the present disclosure can be realized. The method of realizing the communication method according to the present disclosure is not limited to the above. The communication method according to the present disclosure can be realized by, for example, an appropriate device (an information processing device such as a computer, a dedicated embedded device or the like) capable of performing the same operation as the communication device (100, 300). Note that the present disclosure may be realized as a system including a plurality of the communication devices (100, 130).

Further, the technical scope of the present disclosure is not limited to the scope described in each of the example embodiments and modifications described above. It is clear to those skilled in the art that various modifications or improvements can be made to such example embodiments. In such a case, a new example embodiment with such modification or improvement can also be included in the technical scope of the present disclosure. Furthermore, example embodiments of combination of each of the above-described example embodiments and modifications, or new example embodiments with such modifications or improvements are also included in the technical scope of the present disclosure.

The present invention has been described above by exemplifying the above-described example embodiment as a typical example. However, the present invention is not limited to the above-described example embodiment. That is, in the present invention, various aspects that can be understood by those skilled in the art can be applied within the scope of the present invention.

The whole or part of the exemplary example embodiments disclosed above can be described as, but not limited to, the following supplementary notes.

Supplementary Note 1

A communication device includes:
a memory; and
at least one processor coupled to the memory,
the processor performing operations, the operations includes:
according to synchronization accuracy representing a frequency of timings at which a cryptosystem used for encryption communication between the communication device and another communication device can be changed, selecting the cryptosystem with different processing load on cryptographic processing in the encryption communication; and
executing at least one of encryption processing and decryption processing on communication data with the another communication device by using the crypto system selected.

Supplementary Note 2

The communication device according to supplementary note 1,
wherein the operations further includes
determining that the synchronization accuracy is higher as the timings at which the cryptosystem can be changed between the communication device and the another communication device increases, and
selecting the crypto system with low processing load on the cryptographic processing from among a plurality of the cryptosystems with different processing loads on the cryptosystem as the synchronization accuracy is higher.

Supplementary Note 3

The communication device according to supplementary note 1 or 2,
wherein the operations further includes
determining that the synchronization accuracy is lower as the timings at which the cryptosystem can be changed between the communication device and the another communication device decreases, and
selecting the crypto system with high processing load on the cryptographic processing from among a plurality of the cryptosystems with different processing loads on the cryptosystem as the synchronization accuracy is lower.

Supplementary Note 4

The communication device according to supplementary note 2 or 3,
wherein the cryptosystem selection means adjusts the operations further includes adjusting the update interval to update the cryptosystem according to the synchronization accuracy.

Supplementary Note 5

The communication device according to supplementary note 4,
wherein the operations further includes updating the cryptosystem at shorter interval as the synchronization accuracy is higher.

Supplementary Note 6

The communication device according to supplementary note 4 or 5,
wherein the operations further includes updating the cryptosystem at longer interval as the synchronization accuracy is lower.

Supplementary Note 7

The communication device according to any one of supplementary notes 2 to 6, the operations further includes:

generating clock information representing the timing by using a periodic clock signal;

executing processing to synchronize the clock information by transmitting and receiving information used for synchronization of the clock information between the communication device and the another communication device; determining the synchronization accuracy according to synchronization status of the clock information;

generating the encryption key used for the cryptographic processing according to the clock information, selecting the cryptosystem according to the synchronization accuracy related to the clock information determined; and generating the encryption key according to the cryptosystem selected.

Supplementary Note 8

The communication device according to supplementary note 7, wherein the operations further includes determining the synchronization accuracy related to the clock information, based on at least one of the magnitude of difference of the clock information between the communication device and the another communication device and the information representing the accuracy of the clock information generated by the another communication device.

Supplementary Note 9

The communication device according to supplementary note 7 or 8, wherein the operations further includes storing adjustment information representing the difference of the clock information between the communication device and the another communication device for the another communication device, and generating the encryption key according to the adjusted clock information calculated from the adjustment information and the clock information generated in the communication device, and the cryptosystem selected.

Supplementary Note 10

The communication device according to any one of supplementary notes 1 to 9, wherein the cryptosystem includes at least one of an encryption algorithm, the encryption key, and a cryptographic usage mode used for the encryption communication.

Supplementary Note 11

A communication method includes:

according to synchronization accuracy representing a frequency of timings at which a cryptosystem used for encryption communication between the communication device and another communication device can be changed, selecting the cryptosystem with different processing load on cryptographic processing in the encryption communication; and executing at least one of encryption processing and decryption processing on communication data with the another communication device by using the cryptosystem selected.

Supplementary Note 12

A non-transitory computer-readable recording medium embodying a communication program, the communication program causing a computer to perform a method, the method includes:

according to synchronization accuracy representing a frequency of timings at which a crypto system used for encryption communication between the communication device and another communication device can be changed, selecting the cryptosystem with different processing load on cryptographic processing in the encryption communication; and executing at least one of encryption processing and decryption processing on communication data with the another communication device by using the cryptosystem selected.

REFERENCE SIGNS LIST

100 Communication device
101 Cryptosystem selection unit
102 Cryptographic processing unit
300 Communication device
301 Device-status management unit
302 Clock generation unit
303 Cryptosystem selection unit
304 Key generation unit
305 Cryptographic processing unit
306 Communication unit
307 Data transfer unit
601 Processor
602 Memory
603 Clock generator
604 Communication interface
605 Storage
606 Input and/or output interface
607 Input and/or output device
608 Drive device
609 Storage medium
701 Cryptographic processing device

The invention claimed is:

1. A communication device comprising:
a memory; and
at least one processor coupled to the memory,
the processor performing operations, the operations comprising:
    determining whether a synchronization accuracy is higher or lower by using predetermined information, the synchronization accuracy representing a frequency of timings at which a cryptosystem used for encryption communication between the communication device and another communication device can be changed in synchronization;
    selecting the cryptosystem with a lower processing load on cryptographic processing in the encryption communication when the synchronization accuracy is higher;
    selecting the cryptosystem with a higher processing load on the cryptographic processing in the encryption communication when the synchronization accuracy is lower; and
    executing at least one of encryption processing and decryption processing on communication data with the another communication device by using the cryptosystem selected.

2. The communication device according to claim 1,
wherein the operations further comprise
- determining that the synchronization accuracy is higher as the timings at which the cryptosystem can be changed between the communication device and the another communication device increases, and
- selecting the cryptosystem with the lower processing load on the cryptographic processing from among a plurality of the cryptosystems with different processing loads on the cryptosystem as the synchronization accuracy is higher.

3. The communication device according to claim 1,
wherein the operations further comprise
- determining that the synchronization accuracy is lower as the timings at which the cryptosystem can be changed between the communication device and the another communication device decreases, and
- selecting the cryptosystem with the higher processing load on the cryptographic processing from among a plurality of the cryptosystems with different processing loads on the cryptosystem as the synchronization accuracy is lower.

4. The communication device according to claim 2,
wherein the operations further comprise adjusting an update interval to update the cryptosystem according to the synchronization accuracy.

5. The communication device according to claim 4,
wherein the operations further comprise updating the cryptosystem at a shorter interval as the synchronization accuracy is higher.

6. The communication device according to claim 4,
wherein the operations further comprise updating the cryptosystem at a longer interval as the synchronization accuracy is lower.

7. The communication device according to claim 2, the operations further comprise:
- generating clock information representing at least one timing of the timings by using a periodic clock signal;
- executing processing to synchronize the clock information by transmitting and receiving information used for synchronization of the clock information between the communication device and the another communication device determining the synchronization accuracy according to synchronization status of the clock information;
- generating an encryption key used for the cryptographic processing according to the clock information,
- selecting the cryptosystem according to the synchronization accuracy related to the clock information determined
- generating the encryption key according to the cryptosystem selected.

8. The communication device according to claim 7,
wherein the operations further comprise determining the synchronization accuracy related to the clock information, based on at least one of a magnitude of a difference of the clock information between the communication device and the another communication device and the information representing the accuracy of the clock information generated by the another communication device.

9. The communication device according to claim 7,
wherein the operations further comprise storing adjustment information representing a difference of the clock information between the communication device and the another communication device for the another communication device, and
generating the encryption key according to the adjusted clock information calculated from the adjustment information and the clock information generated in the communication device, and the cryptosystem selected.

10. The communication device according to claim 1,
wherein the cryptosystem includes at least one of an encryption algorithm, an encryption key, and a cryptographic usage mode used for the encryption communication.

11. A communication method comprising:
- determining whether a synchronization accuracy is higher or lower by using predetermined information, the synchronization accuracy representing a frequency of timings at which a cryptosystem used for encryption communication between the communication device and another communication device can be changed in synchronization;
- selecting the cryptosystem with a lower processing load on cryptographic processing in the encryption communication when the synchronization accuracy is higher;
- selecting the cryptosystem with a higher processing load on the cryptographic processing in the encryption communication when the synchronization accuracy is lower; and
- executing at least one of encryption processing and decryption processing on communication data with the another communication device by using the cryptosystem selected.

12. A non-transitory computer-readable recording medium embodying a communication program, the communication program causing a computer to perform a method, the method comprising:
- determining whether a synchronization accuracy is higher or lower by using predetermined information, the synchronization accuracy representing a frequency of timings at which a cryptosystem used for encryption communication between the communication device and another communication device can be changed in synchronization;
- selecting the cryptosystem with a lower processing load on cryptographic processing in the encryption communication when the synchronization accuracy is higher;
- selecting the cryptosystem with a higher processing load on the cryptographic processing in the encryption communication when the synchronization accuracy is lower; and
- executing at least one of encryption processing and decryption processing on communication data with the another communication device by using the cryptosystem selected.

* * * * *